United States Patent
Takemoto et al.

(10) Patent No.: US 10,168,546 B2
(45) Date of Patent: Jan. 1, 2019

(54) ZOOM LENS AND IMAGE PICKUP APPARATUS INCLUDING SAME

(71) Applicant: CANON KABUSHIKI KAISHA, Tokyo (JP)

(72) Inventors: Shoichi Takemoto, Saitama (JP); Tsuyoshi Wakazono, Utsunomiya (JP); Nobuyuki Miyazawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 78 days.

(21) Appl. No.: 15/460,942

(22) Filed: Mar. 16, 2017

(65) Prior Publication Data
US 2017/0269374 A1  Sep. 21, 2017

(30) Foreign Application Priority Data

Mar. 17, 2016  (JP) ................................ 2016-054026

(51) Int. Cl.
| | | |
|---|---|---|
| *G02B 27/64* | (2006.01) | |
| *G02B 7/10* | (2006.01) | |
| *G02B 15/16* | (2006.01) | |

(52) U.S. Cl.
CPC ............. *G02B 27/646* (2013.01); *G02B 7/10* (2013.01); *G02B 15/16* (2013.01)

(58) Field of Classification Search
CPC ...... G02B 27/646; G02B 15/16; G02B 27/10; G02B 27/64; G02B 7/04; G02B 27/642; G02B 27/644; G02B 27/648; G02B 2205/0007; H04N 5/23264
USPC ................................................ 359/554–557
See application file for complete search history.

(56) References Cited

U.S. PATENT DOCUMENTS

| | | | |
|---|---|---|---|
| 9,264,638 B2 | 2/2016 | Nakamura et al. | |
| 9,268,120 B2 | 2/2016 | Shimomura et al. | |
| 9,310,589 B2 | 4/2016 | Wakazono et al. | |
| 9,310,592 B2 | 4/2016 | Wakazono et al. | |
| 2014/0293438 A1 | 10/2014 | Miyazawa | |
| 2015/0316755 A1 | 11/2015 | Takemoto | |

(Continued)

FOREIGN PATENT DOCUMENTS

JP  H10-186209 A  7/1998

OTHER PUBLICATIONS

JP H10-186209 (1998), cited by applicant, machine translation.*

*Primary Examiner* — Ricky Mack
*Assistant Examiner* — Kristina Deherrera
(74) *Attorney, Agent, or Firm* — Carter, DeLuca, Farrell & Schmidt LLP

(57) ABSTRACT

A zoom lens includes a focus lens unit that moves in focus adjustment, a magnification lens unit including lens units that move in magnification, and a relay lens unit that does not move for magnification, in this order from the object side toward the image side, and a correction lens unit that is disposed in the focus lens unit or magnification lens unit and moves in the optical axis direction to correct displacement of the in-focus position. The amounts of change in in-focus position at the wide angle and telephoto ends with the correction lens unit moved by 1 mm in the optical axis direction, the maximum absolute value of the amount of movement of the correction lens unit for correcting displacement of the in-focus position, and the maximum absolute value of the amount of movement of the lens units in the magnification lens unit are set as appropriate.

8 Claims, 11 Drawing Sheets

(56) References Cited

U.S. PATENT DOCUMENTS

| | | |
|---|---|---|
| 2015/0362711 A1 | 12/2015 | Wakazono et al. |
| 2016/0054549 A1 | 2/2016 | Takemoto |
| 2016/0054579 A1 | 2/2016 | Miyazawa |
| 2016/0154226 A1 | 6/2016 | Miyazawa |
| 2017/0108678 A1 | 4/2017 | Miyazawa et al. |
| 2017/0108680 A1 | 4/2017 | Kikuchi et al. |

* cited by examiner

ZOOM LENS AND IMAGE PICKUP APPARATUS INCLUDING SAME

BACKGROUND OF THE INVENTION

Field of the Invention

The present invention relates to a zoom lens and an image pickup apparatus including the same, and is favorable for cameras for broadcasting and filmmaking, home-use video cameras, and the like in which the amounts of displacement of the in-focus position due to manufacturing errors and changes in temperature are well corrected.

Description of the Related Art

Generally, a zoom lens for use in shooting television programs, shooting films, or doing the like includes a focus lens unit for focusing, a magnification lens unit including a variator for magnification and a compensator for correction of image plane displacement resulting from magnification, and an imaging lens unit for imaging, in this order from the object side. Note that for some lenses for broadcasting, an extender unit is disposed in the imaging lens unit so as to be switchable in position.

Further, to bring a subject into focus, manual focusing is performed in which the focus lens unit is driven in the optical axis direction by mechanically transmitting a manual operation to the focus lens unit or by electrically driving the focus lens unit in accordance with the manual operation.

The shooting of television programs and films often involves not only bringing a subject into focus but also purposely bringing a subject out of focus as a visual effect. For this reason, the above manual focusing is performed to allow focusing at the shooter's will.

Also, in sports broadcasting and studio shooting, quick zoom operation is required. For this reason, a zoom cam mechanism has been commonly used which moves a magnification lens unit in the optical axis direction via rotation of a cam cylinder.

Zoom lenses that are driven by manual focus and zoom cam mechanisms as mentioned above have a problem in that the in-focus position in a middle zoom range is displaced by manufacturing variations in refractive index of the magnification lens unit, intervals therein, and the like and changes in temperature.

Further, there has been a problem in that the in-focus position is displaced by a change in spherical aberration between when the stop is opened and when the stop is closed, a change in spherical aberration due to the positioning of the focus lens, a change in posture, and so on.

In order to solve the above problems, it is necessary to reduce manufacturing variations and perform precise assembly adjustment. However, with the spread of high-definition cameras in recent years, the resolving power has become higher and the depth of focus has become shallower than those of conventional HD cameras. Accordingly, it has become difficult to keep the above-mentioned displacement of the in-focus position within the depth of focus.

In order to address such a problem, Japanese Patent Application Laid-Open No. H10-186209, for example, proposes the following method. Specifically, at the time of assembling a lens, displacements of the in-focus position are figured out in advance which are caused by changes in zoom position, in stop position, and in position of an extender. Then, when the zoom position, the stop position, or the position of the extender is changed while the lens is used, the amount of shift of the in-focus position is figured out from a lookup table or a calculation equation on the basis of that change, and a master lens unit (imaging lens unit) is driven to cancel out the amount of that displacement.

Japanese Patent Application Laid-Open No. H10-186209, however, does not at all disclose any specific lens arrangement or configuration for achieving quick zoom operation and good optical performance while correcting displacement of the in-focus position.

SUMMARY OF THE INVENTION

In view of the above, an object of the present invention is to provide a zoom lens including manual focus and zoom cam mechanisms and being capable of achieving good correction of displacements of the in-focus position caused by changes in zoom position, changes in temperature, and the like while achieving quick zoom operation and good optical performance, and to provide an image pickup apparatus including the zoom lens.

To achieve the above-mentioned object, a zoom lens of the present invention includes in order from an object side to an image side: a focus lens unit that moves in focus adjustment, a magnification lens unit including two or more lens units that move in magnification, and a relay lens unit that does not move for varying magnification. This zoom lens includes a correction lens unit that is disposed in the focus lens unit or the magnification lens unit and moves in an optical axis direction to correct displacement of an in-focus position. Conditions of $$0.001 < Mb/Mm < 0.100,$$

$$0.005 < |\Delta Skw| < 0.500, \text{ and}$$

$$0.001 < \Delta Skw/\Delta Skt < 0.100$$

are satisfied, where $\Delta Skw$ and $\Delta Skt$ are amounts (mm) of change in the in-focus position respectively at a wide angle end and a telephoto end with the correction lens unit moved by 1 mm in the optical axis direction, Mb is a maximum absolute value of an amount of movement of the correction lens unit for correcting displacement of the in-focus position, and Mm is a maximum absolute value of an amount of movement of the lens units in the magnification lens unit.

The present invention can provide a zoom lens being capable of achieving good correction of displacements of the in-focus position caused by changes in zoom position, changes in temperature, and the like while achieving quick zoom operation and good optical performance, and an image pickup apparatus including the zoom lens.

Further features of the present invention will become apparent from the following description of exemplary embodiments with reference to the attached drawings.

DESCRIPTION OF THE EMBODIMENTS

Embodiments of the present invention will now be described in detail in accordance with the accompanying drawings.

Figure 1:
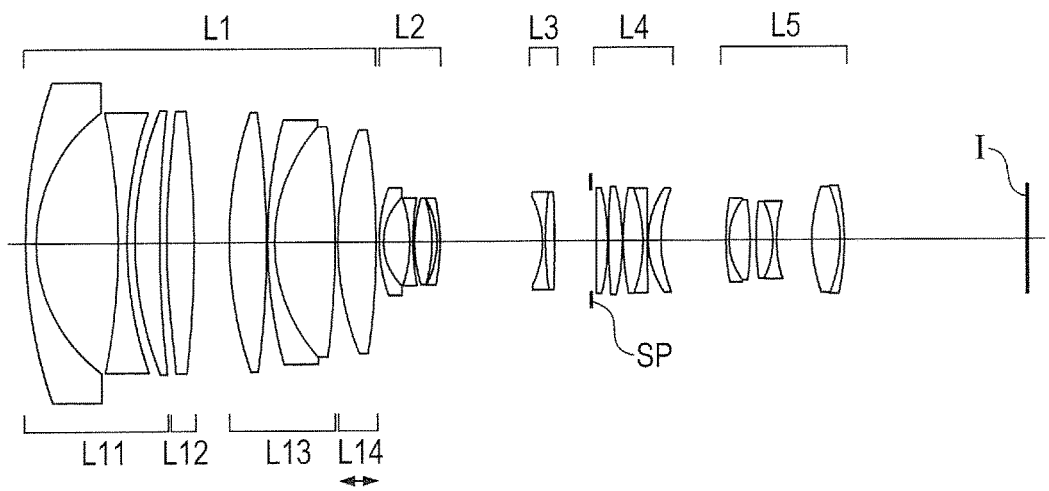
FIG. 1 is a cross-sectional view of a lens according to embodiment 1 at the wide angle end in focus at infinity.
Figure 2A:
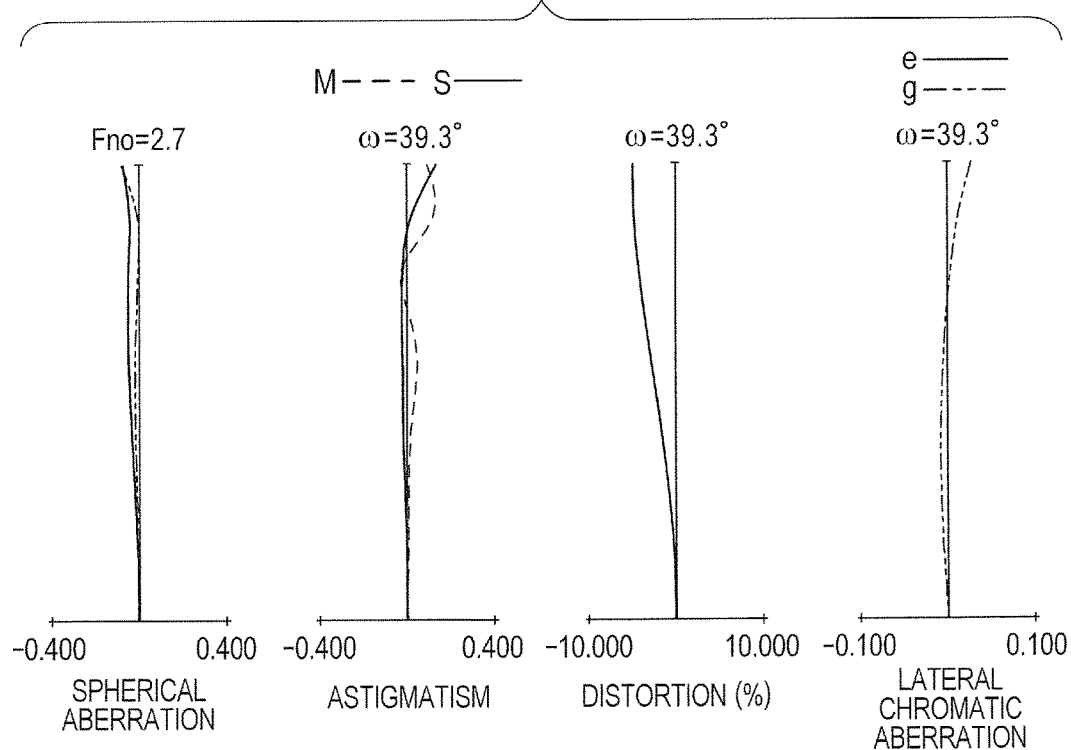
FIG. 2A is a set of diagrams of aberrations at the wide angle end with an infinite distance object in focus in embodiment 1.
Figure 2B:
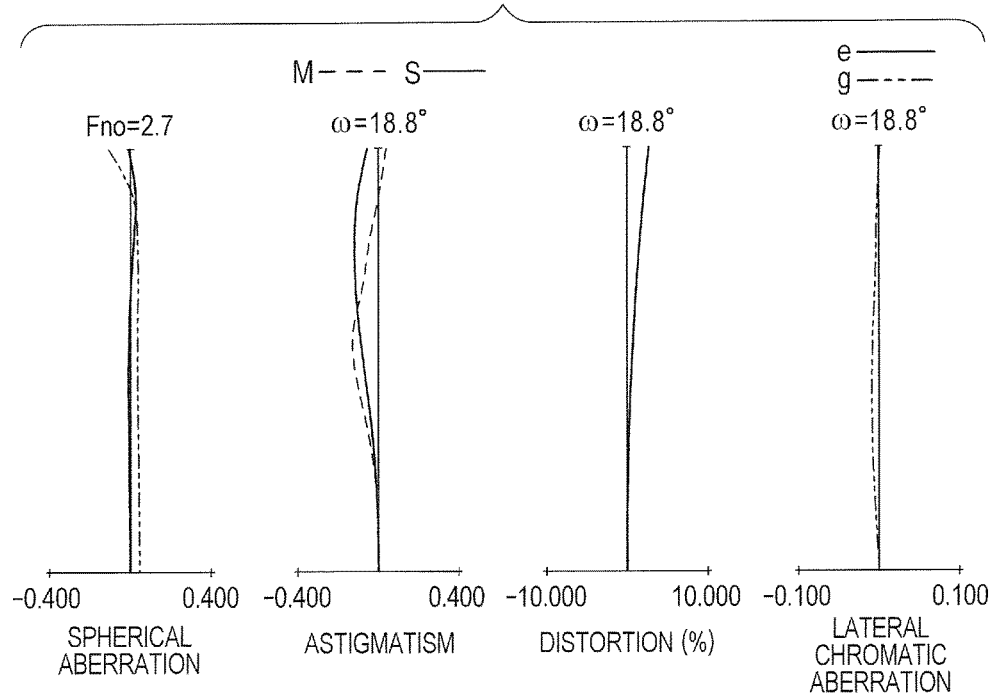
FIG. 2B is a set of diagrams of aberrations at a focal length of 45.6 mm with an infinite distance object in focus in embodiment 1.
Figure 2C:
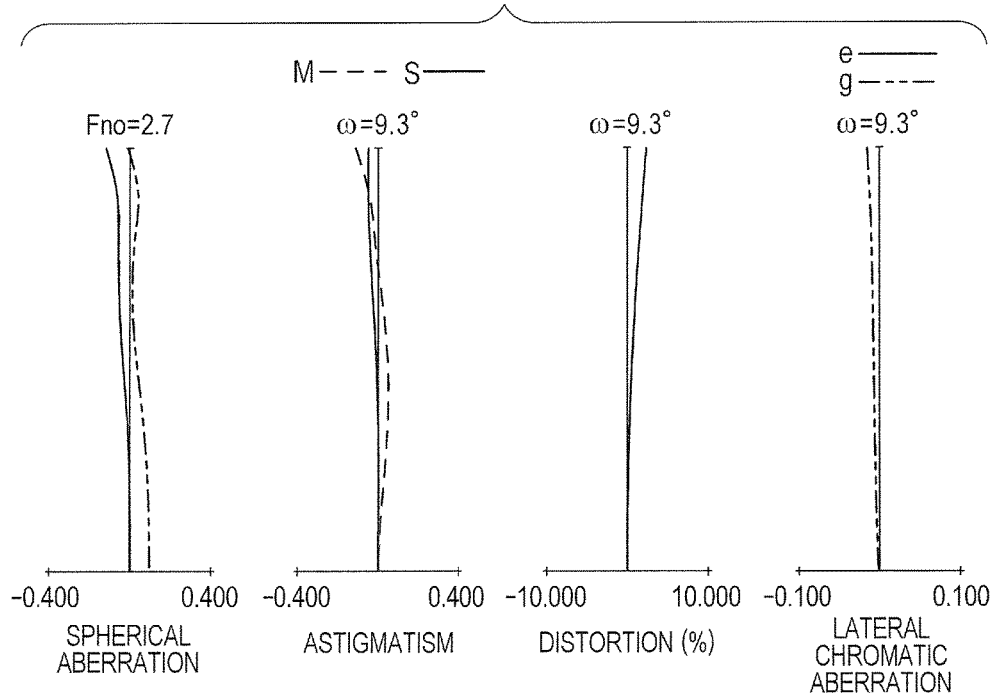
FIG. 2C is a set of diagrams of aberrations at the telephoto end with an infinite distance object in focus in embodiment 1.

FIG. 1 is a cross-sectional view of a lens in focus on an infinite distance object at a wide angle end in numerical example 1 as embodiment 1 of the present invention. FIGS. 2A, 2B, and 2C are diagrams of longitudinal aberrations at the wide angle end, a focal length of 45.6 mm, and a telephoto end in numerical example 1 with an infinite distance object in focus.

In the longitudinal aberration diagrams, the spherical aberration shows the e line (solid line) and the g line (dotted line). The astigmatism shows the meridional image plane (dotted line) and the sagittal image plane (solid line) of the e line. The lateral chromatic aberration is shown by the g line (dotted line). Fno represents the F-number, and ω represents the half angle of field. In the longitudinal aberration diagrams, the spherical aberration, the astigmatism, the distortion, and the lateral chromatic aberration are illustrated on 0.4-mmm, 0.4-mm, 10%, and 0.1-mm scales, respectively.

The zoom lens in embodiment 1 will be specifically described with reference to FIG. 1.

In FIG. 1, a first lens unit L1 is a lens unit with a positive refractive power that does not move for magnification. A second lens unit L2 is a variator with a negative refractive power that moves in magnification, and performs magnification from the wide angle end to the telephoto end by monotonically moving on the optical axis toward the image plane side. A third lens unit L3 is a compensator with a negative refractive power, and corrects image plane displacement resulting from magnification by moving on the optical axis. SP is a stop, and a fourth lens unit L4 is a front relay lens unit. A fifth lens unit L5 is a rear relay lens unit. I is an image pickup plane. Moreover, the first lens unit L1 includes a first lens sub unit L11 with a negative refractive power, a second lens sub unit L12 with a positive refractive power, a third lens sub unit L13 with a positive refractive power, and a fourth lens sub unit L14 with a positive refractive power, and performs focusing on a close distance object by feeding the second lens sub unit L12 from the object side toward the image side. In magnification, the intervals between the adjacent lens units among the first lens unit L1, the second lens unit L2, the third lens unit L3, and the fourth lens unit L4 are changed.

A correction lens unit of the present invention includes one to three lenses. In embodiment 1, the correction lens unit is identical to the fourth lens sub unit L14 in the first lens unit, and moves on the optical axis to correct displacement of the in-focus position.

Figure 3:
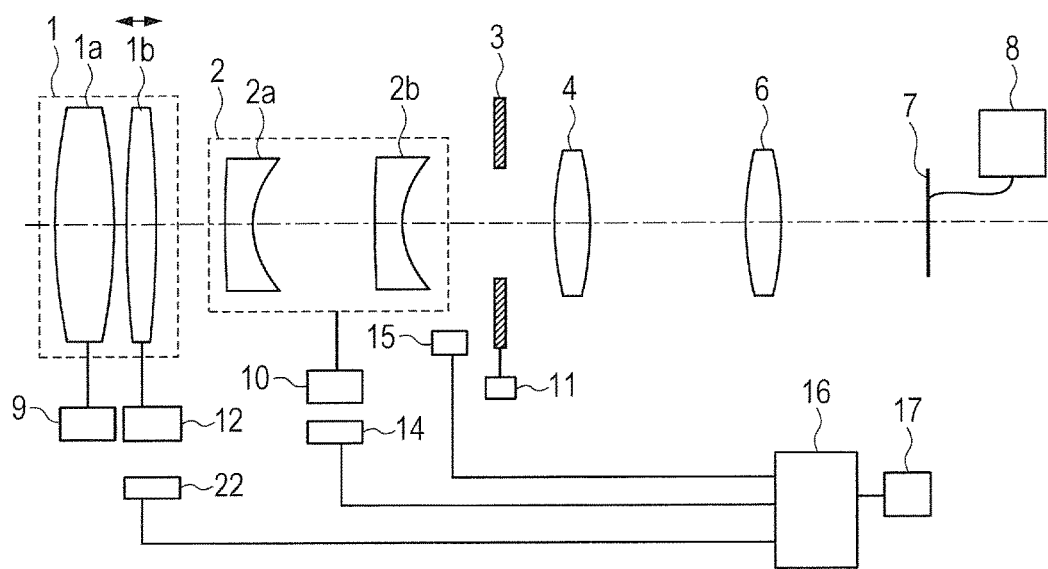
FIG. 3 is a schematic diagram of main parts of an image pickup apparatus according to embodiment 1.

FIG. 3 shows the configuration of an image pickup apparatus which is embodiment 1 of the present invention.

Figure 13:
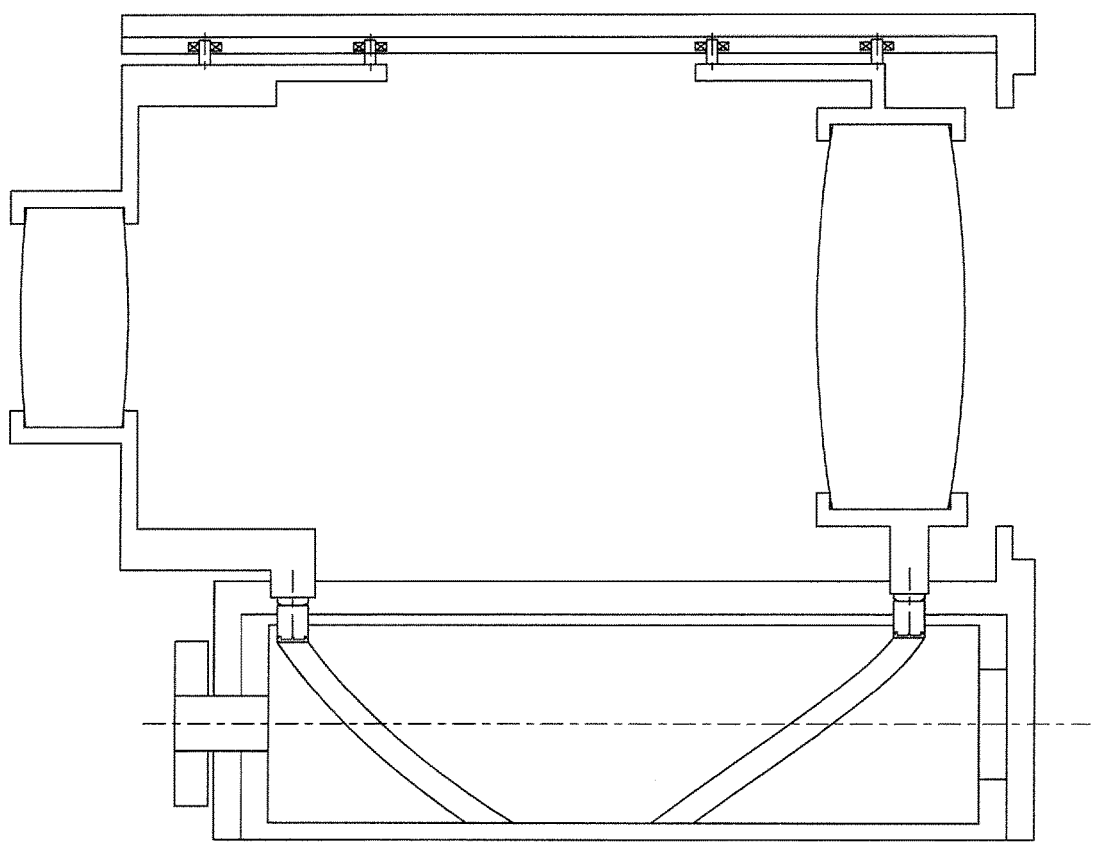
FIG. 13 is a schematic diagram of a zoom cam mechanism.

In the figure, reference sign 1 denotes a focus lens unit corresponding to the first lens unit L1. Reference sign 2 denotes a magnification lens unit corresponding to the second and third lens units, and it includes a lens unit 2a that performs magnification by moving on the optical axis and a lens unit 2b that corrects the image plane displaced by magnification. Reference sign 3 denotes an aperture stop. Reference sign 4 denotes a front relay lens unit corresponding to the fourth lens unit L4, and reference sign 6 denotes a rear relay lens corresponding to the fifth lens unit L5. In embodiment 1, the correction lens unit is the lens unit 1b and is identical to the fourth lens sub unit L14, which is a part of the focus lens unit, and moves on the optical axis to correct displacement of the in-focus position. In this embodiment, the above elements 1 to 4 and 6 form a zoom lens. Reference sign 7 denotes an image pickup element that receives an optical image formed by the zoom lens. Reference sign 8 denotes a video signal processing circuit, and it obtains video signals based on signals from the image pickup element 7. Reference sign 9 denotes a drive part for the focus lens unit 1, and it drives the focus lens unit 1 in the optical axis direction by means of a mechanism such as a helicoid or a cam. Reference sign 10 denotes a drive part for the magnification lens unit 2, and it drives the magnification lens unit 2 in the optical axis direction by means of a cam mechanism, as shown in FIG. 13. Reference sign 11 denotes a drive part that adjusts the aperture diameter of the aperture stop 3. Reference sign 12 denotes a drive part for the correction lens unit. Reference sign 14 denotes a zoom position detector that detects the zoom position of the magnification lens unit 2. Reference sign 15 denotes a temperature sensor that detects temperature. Reference sign 22 denotes a position detector (correction position detector) for the correction lens unit. Reference sign 16 denotes a computation part, and it performs computation for controlling various drive operations for the whole zoom lens. Reference sign 17 denotes a record part, and it records amounts of displacement of the in-focus position caused by changes in zoom position and changes in temperature.

Here, the amount of displacement of the in-focus position will be described. Under normal circumstances, a subject at a particular distance is brought into focus by moving the focus lens unit to a particular position. However, a manufacturing error of the cam that drives the compensator unit might change the in-focus position in the course of zooming, and the expansion or shrinkage of a lens or mechanical member due to a change in ambient temperature might change the in-focus position. In the present invention, the amount of shift resulting from a change in in-focus position is defined as the amount of displacement of the in-focus position.

Assume that the in-focus position has been displaced due to changes in zoom position and changes in temperature in embodiment 1. In embodiment 1, displacements of the in-focus position due to changes in zoom position and changes in temperature are recorded in the record part 17 at the time of assembly adjustment. Then, based on signals from the zoom position detector 14 and the temperature sensor 15, the computation part 16 selects an amount of displacement of the in-focus position recorded in the record part 17, and inputs it to the drive part 12 for the correction lens unit. Based on the signal from the computation part 16, the drive part 12 for the correction lens unit moves the correction lens unit 1b on the optical axis to correct the amount of displacement of the in-focus position.

The zoom lens of the present invention relates to a zoom lens including a focus lens unit that moves in focus adjustment, a magnification lens unit including two or more lens units that move on the optical axis in magnification, and a relay lens unit that does not move for magnification, in this order from the object side toward the image side. This zoom lens includes a correction lens unit that moves in the optical axis direction to correct one or more of displacement of the in-focus position due to a change in zoom position, displacement of the in-focus position due to a change in position of the focus lens unit, displacement of the in-focus position due to a change in temperature, displacement of the in-focus position due to a change in stop value, and displacement of the in-focus position due to a change in posture of the zoom lens. This correction lens unit is characterized in that it is disposed in the focus lens unit or the magnification lens unit and satisfies the following conditions, where ΔSkw and ΔSkt are the amounts (mm) of change in in-focus position respectively at the wide angle end and the telephoto end with the correction lens unit moved by 1 mm, Mb is the maximum absolute value of the amount of movement of the correction lens unit for correcting displacement of the in-focus position, and Mm is the maximum absolute value of the amount of movement of the lens units in the magnification lens unit.

$$0.001 < Mb/Mm < 0.100 \tag{1}$$

$$0.005 < |\Delta Skw| < 0.500 \tag{2}$$

$$0.001 < \Delta Skw/\Delta Skt < 0.100 \tag{3}$$

Conditional expression (1) defines the range of the ratio of the maximum absolute value of the amount of movement of the correction lens unit for correcting a change in in-focus position to the maximum absolute value of the amount of movement of the lens units in the magnification lens unit. In this way, conditional expression (1) defines a condition for achieving quick zoom operation and high optical performance while achieving good correction of displacement of the in-focus position.

In order to achieve quick zoom operation as mentioned above, the magnification lens unit is driven at high speed in the optical axis direction by rotation of a cam cylinder. If the driving of the correction lens unit does not quickly follow the driving of the magnification lens unit, an odd video is obtained during image capturing such that the video comes into focus with a time lag. The correction lens unit includes, for example, a stepping motor and a rack engaging a feed screw which is the motor's output shaft, and is driven in the optical axis direction. For this reason, if the amount of movement of the correction lens unit is too large, the correction lens unit takes time to reach the desired drive position. Also, if the absolute value of the amount of movement of the correction lens unit is too large, the spherical aberration, astigmatism, and chromatic aberration vary so greatly that high optical performance cannot be achieved. If, on the other hand, the absolute value of the amount of movement of the correction lens is too small, it is impossible to correct a shift of the in-focus position due to a change in zoom position, a change in temperature, or the like as mentioned above. For this reason, the ratio of the maximum absolute value of the amount of movement of the correction lens unit to the maximum absolute value of the amount of movement of the lens units in the magnification lens unit needs to be set within an appropriate range in order to achieve quick zoom operation and high optical performance while achieving good correction of displacement of the in-focus position.

If Mb/Mm exceeds the upper limit of conditional expression (1), the maximum absolute value Mb of the amount of movement of the correction lens unit is too large for the maximum absolute value Mm of the amount of movement of the lens units in the magnification lens unit. This makes it difficult to follow the speed of driving of the magnification lens unit. Also, the variation in aberration due to movement of the correction lens unit is too large, thus making it difficult to maintain high optical performance.

If Mb/Mm falls below the lower limit of conditional expression (1), the maximum absolute value Mb of the amount of movement of the correction lens unit is too small for the maximum absolute value Mm of the amount of movement of the lens units in the magnification lens unit. This makes it impossible to sufficiently correct displacement of the in-focus position.

Conditional expression (1) is more preferably set as below.

$$0.002 < Mb/Mm < 0.030 \tag{1a}$$

Conditional expression (2) defines a condition for achieving quick zoom operation and high optical performance while achieving good correction of displacement of the in-focus position by defining the range of the amount of displacement of the in-focus position at the wide angle end with the correction lens unit moved by 1 mm in the optical axis direction.

If |ΔSkw| exceeds the upper limit of conditional expression (2), the change ΔSkw in in-focus position with the correction lens unit moved is too large. Thus, only a small change of the correction lens unit will cause displacement of the in-focus position. Also, if such a small change of the correction lens unit is to be suppressed, the accuracy of stopping the stepping motor will be too high.

If |ΔSkw| falls below the lower limit of conditional expression (2), the change ΔSkw in in-focus position with the correction lens unit moved is too small, and the absolute value of the amount of movement of the correction lens unit for correcting displacement of the in-focus position is too large. This makes it difficult to follow the speed of driving of the magnification lens unit. Also, the variation in aberration due to movement of the correction lens unit is too large, thus making it difficult to maintain high optical performance.

Conditional expression (2) is more preferably set as below.

$$0.010 < |\Delta Skw| < 0.300 \quad (2a)$$

Conditional expression (3) defines the range of the ratio of the change ΔSkw in in-focus position at the wide angle end to the change ΔSkt in in-focus position at the telephoto end with the correction lens unit moved by 1 mm in the optical axis direction.

As lenses in the zoom lens on the object side from the magnification unit including the magnification unit experience a change in temperature or in lens posture, the position of the imaging point of the lens units is changed. The change in position of the imaging point is made larger or smaller by the magnification unit, thereby changing the in-focus position at the image plane. With Δfi representing change in position of the imaging point of a lens unit i, change ΔSki in in-focus position at the image plane is expressed by the following relation using $\beta_i$ as the lateral magnification of the lens unit i and $\beta_{i+1\text{-}k}$ as the lateral magnification of a lens unit on the image side beyond the lens unit i.

$$\Delta Ski = \Delta fi \times (1-\beta_i^2) \times \beta_{i+1\text{-}k}^2$$

According to the above relational equation, in the case of a zoom lens with a magnification power of Z, the change in in-focus position due to a change in position of the imaging point occurring from the focus unit is made $Z^2$ times larger at the telephoto end than at the wide angle end. Then, in the case of a lens configuration where ΔSkt and ΔSkw hardly differ, the absolute value of the amount of movement for correcting displacement of the in-focus position changes greatly between the wide angle end and the telephoto end. Consequently, there arise problems in that it is difficult for the driving of the correction unit to follow the speed of driving of the magnification lens unit, and so on.

If ΔSkw/ΔSkt exceeds the upper limit of conditional expression (3), the change ΔSkt in in-focus position at the telephoto end is too small for movement Mc of the collection lens unit for correction of displacement of the in-focus position, and the absolute value of the amount of movement of the correction lens unit for correcting displacement of the in-focus position is too large. This makes it difficult to follow the speed of driving of the magnification lens unit. Also, the variation in aberration due to movement of the correction lens unit is too large, thus making it difficult to maintain high optical performance.

If ΔSkw/ΔSkt falls below the lower limit of conditional expression (3), the change ΔSkw in in-focus position at the wide angle end is too small for the movement Mc of the collection lens unit for correction of displacement of the in-focus position, and the absolute value of the amount of movement of the correction lens unit for correcting displacement of the in-focus position is too large. This makes it difficult to follow the speed of driving of the magnification lens unit. Also, the variation in aberration due to movement of the correction lens unit is too large, thus making it difficult to maintain high optical performance.

Conditional expression (3) is more preferably set as below.

$$0.002 < \Delta Skw / \Delta Skt < 0.070 \quad (3a)$$

Further, in the present invention, it is preferable to satisfy the following conditions, where Fno is the maximum aperture of the zoom lens, δ is the diameter (mm) of permissible circle of confusion of an image pick apparatus, and D is the depth (mm) of focus.

$$D = Fno \times \delta$$

$$1.0 < Mb/D < 300.0 \quad (4)$$

Conditional expression (4) defines a condition for achieving quick zoom operation and high optical performance while achieving good correction of displacement of the in-focus position by defining the range of the absolute value of the amount of movement of the correction unit for correcting displacement of in-focus position.

If Mb/D exceeds the upper limit of conditional expression (4), the maximum absolute value Mb of the amount of movement of the correction lens unit is too large for the depth of focus D, thus making it difficult to follow the speed of driving of the magnification lens unit. Also, the variation in aberration due to movement of the correction lens unit is too large, thus making it difficult to maintain high optical performance.

If Mb/D falls below the lower limit of conditional expression (4), the maximum absolute value Mb of the amount of movement of the correction lens unit is too small for the depth of focus D. This eliminates the effect of the correction of shift of the in-focus position by movement of the correction lens unit.

Conditional expression (4) is more preferably set as below.

$$2.0 < Mb/D < 170.0 \quad (4a)$$

Further, in the present invention, the correction lens unit preferably includes at least one lens but not more than three lenses. If the correction lens unit includes four or more lenses, the increase in mass of the correction lens unit makes it difficult to achieve high-speed control by a stepping motor.

Embodiment 1

The zoom lens shown in embodiment 1 will be specifically described with reference to FIG. 1.

In FIG. 1, the first lens unit L1 is a lens unit with a positive refractive power that does not move for magnification (focus lens unit). The second lens unit L2 is a variator with a negative refractive power that moves in magnification, and performs magnification from the wide angle end to the telephoto end by monotonically moving on the optical axis toward the image plane side. The third lens unit L3 is a compensator with a negative refractive power, and corrects image plane displacement resulting from magnification by moving on the optical axis from the image side toward the object side. SP is a stop, the fourth lens unit L4 is a front relay lens unit, and the fifth lens unit L5 is a rear relay lens unit. I is an image pickup plane. Moreover, the first lens unit L1 includes the first lens sub unit L11 with a negative refractive power, the second lens sub unit L12 with a positive refractive power, the third lens sub unit L13 with a positive refractive power, and the fourth lens sub unit L14 with a positive refractive power, and performs focusing on a close distance object by feeding the second lens sub unit L12 from the object side toward the image side.

In embodiment 1, the correction lens unit is the fourth lens sub unit L14, and moves on the optical axis to correct displacement of the in-focus position.

The first lens unit L1 covers the 1st to 15th surfaces. The first lens sub unit L11 covers the first to sixth surfaces and includes two negative lenses and one positive lens. The second lens sub unit L12 covers the seventh to eighth surfaces and includes one positive lens. The third lens sub unit L13 covers the 9th to 13th surfaces and includes two positive lenses and one negative lens. The fourth lens sub unit L14 covers the 14th to 15th surfaces and includes one positive lens.

The second lens unit L2 covers the 16th to 23rd surfaces and includes three negative lenses and one positive lens. The third lens unit L3 covers the 24th to 26th surfaces and includes one negative lens and one positive lens. The fourth lens unit L4 covers the 28th to 36th surfaces and includes one negative lens and four positive lenses. The fifth lens unit L5 covers the 37th to 45th surfaces and includes three negative lenses and three positive lenses.

The correction lens unit corresponds to the fourth lens sub unit L14 and includes one positive lens.

Aspheric surfaces are used for the 7th and 16th surfaces. They mainly correct variations in distortion and astigmatism due to zooming.

In embodiment 1, the maximum aperture Fno of the zoom lens is 2.7.

The diameter of permissible circle of confusion δ is 0.005 mm. Thus, the depth of focus D is 0.014 mm.

In this embodiment, the maximum amount of displacement of the focus position due to a change in zoom position is 0.2D (wide angle end) to 1D (telephoto end), i.e. 0.003 (wide angle end) to 0.014 (telephoto end) mm. The maximum amount of displacement of the focus position due to a change in temperature is 8D (wide angle end) to 40D (telephoto end), i.e. 0.112 (wide angle end) to 0.560 (telephoto end) mm. From the above, the in-focus position changes by 0.115 (wide angle end) to 0.576 (telephoto end) mm. Then, the amount of change in in-focus position by movement of the correction lens unit may be set at 0.115 (wide angle end) to 0.576 (telephoto end) mm. The amount of change in in-focus position by 1 mm of movement of the correction lens unit is 0.176 (wide angle end) to 4.400 (telephoto end) mm. Then, the maximum absolute value Mb of the amount of movement of the correction lens unit for correcting a change in in-focus position is greatest at the wide angle end and is 0.653 mm. The amount of movement of the second lens unit L2, which has the greatest absolute value of the amount of movement in the magnification lens unit, is 33.73 mm.

Values for the conditional expressions in embodiment 1 are shown in table 1. Numerical example 1 satisfies all the conditional expressions and implements a zoom lens being capable of achieving good correction of shift of the in-focus position due to changes in zoom position and changes in temperature while achieving quick zoom operation and good optical performance.

Embodiment 2

A zoom lens in embodiment 2 will be specifically described with reference to FIG. 4.

Figure 4:
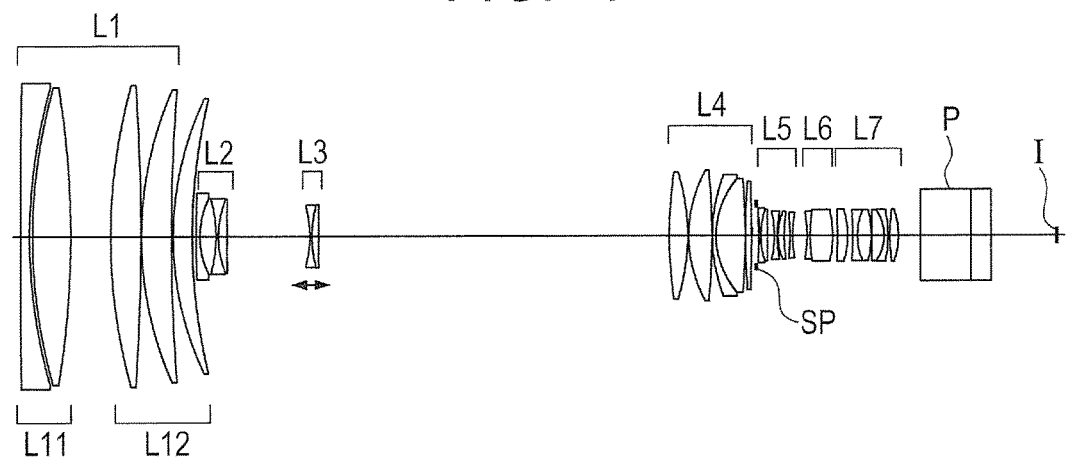
FIG. 4 is a cross-sectional view of a lens according to embodiment 2 at the wide angle end in focus at infinity.
Figure 5A:
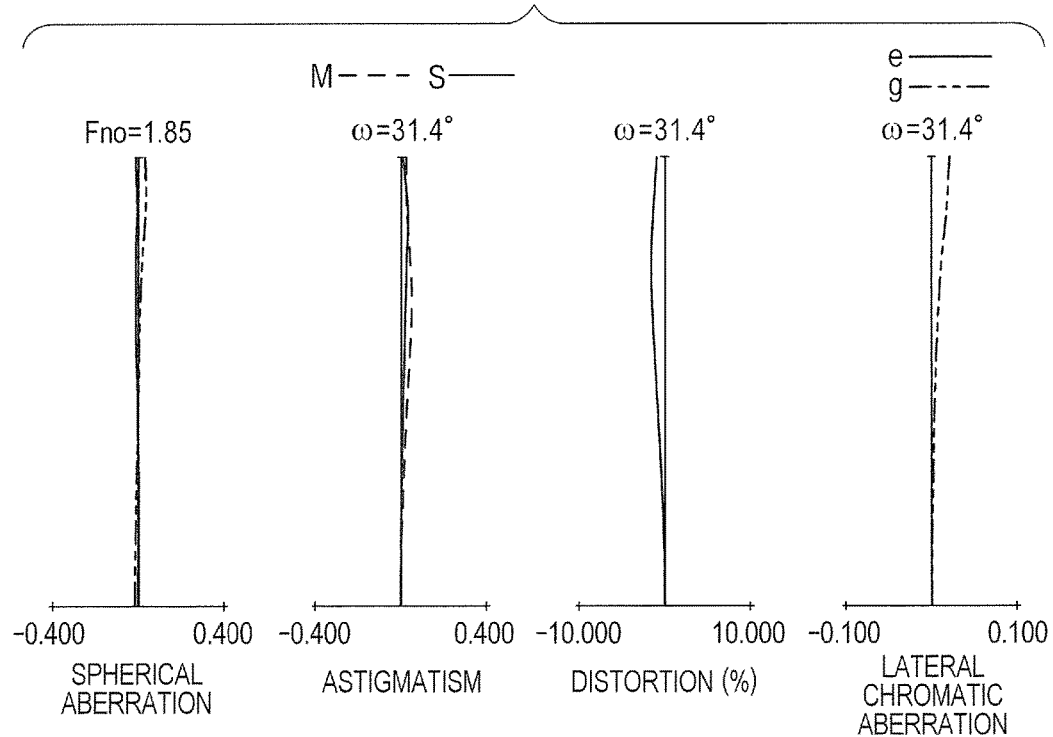
FIG. 5A is a set of diagrams of aberrations at the wide angle end with an infinite distance object in focus in embodiment 2.
Figure 5B:
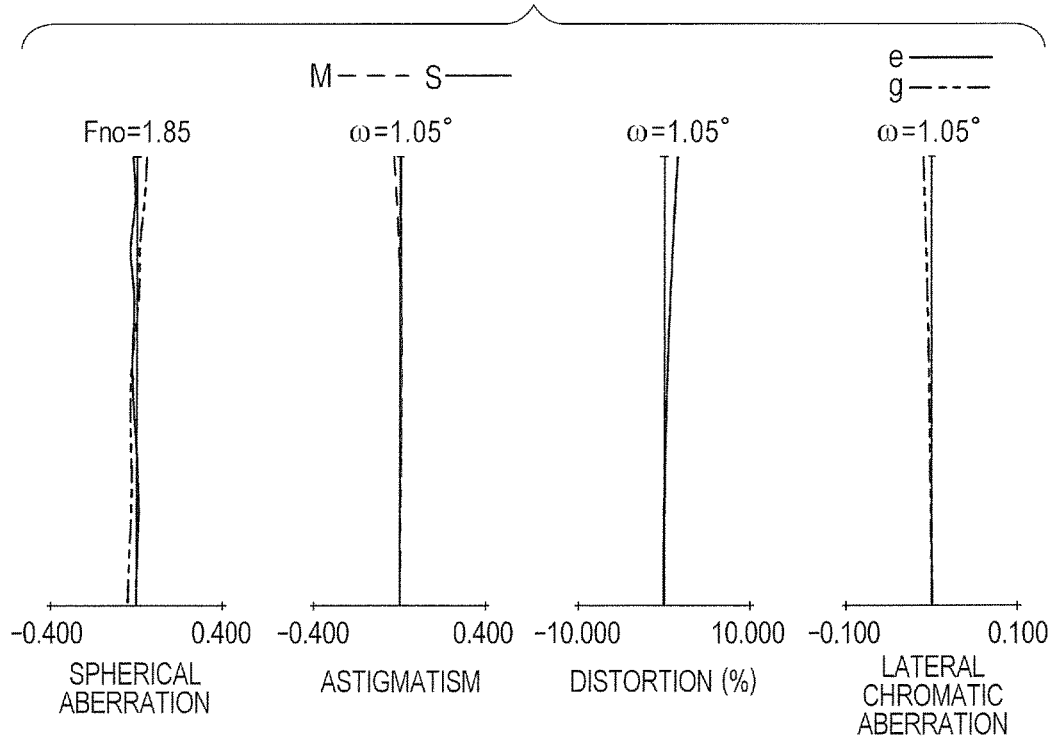
FIG. 5B is a set of diagrams of aberrations at a focal length of 300.0 mm with an infinite distance object in focus in embodiment 2.
Figure 5C:
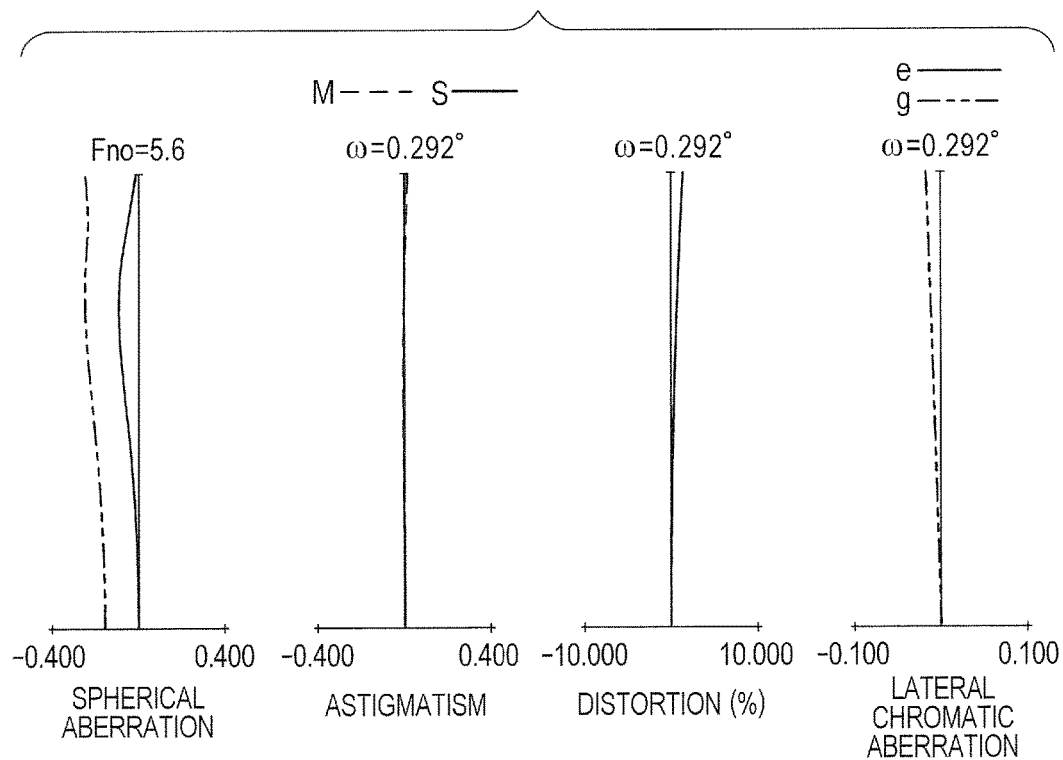
FIG. 5C is a set of diagrams of aberrations at the telephoto end with an infinite distance object in focus in embodiment 2.

In FIG. 4, a first lens unit L1 is a lens unit with a positive refractive power that does not move for magnification. A second lens unit L2 is a variator with a negative refractive power that moves in magnification, and performs magnification from the wide angle end to the telephoto end by monotonically moving on the optical axis toward the image plane side. A third lens unit L3 is a second variator with a negative refractive power, and performs magnification from the wide angle end to the telephoto end by moving on the optical axis from the image side toward the object side. A fourth lens unit L4 is a compensator with a negative refractive power, and corrects image plane displacement resulting from magnification by moving non-linearly on the optical axis toward the object side. SP is a stop, and a fifth lens unit L5 is a front relay lens unit. A sixth lens unit L6 is an extender lens unit and is a lens unit that changes the range of the focal length by being inserted onto and removed from the optical path. A seventh lens unit L7 is a rear relay lens unit. P is a color separation prism optical system, and I is an image pickup plane. Moreover, the first lens unit L1 includes a first lens sub unit L11 with a negative refractive power and a second lens sub unit L12 with a positive refractive power, and performs focusing on a close distance object by feeding the second lens sub unit L12 from the image side toward the object side.

In embodiment 2, a correction lens unit is identical to the third lens unit L3, or the second variator, and moves on the optical axis to correct displacement of the in-focus position.

The first lens unit L1 covers the first to tenth surfaces. The first lens sub unit L11 covers the first to fourth surfaces and includes one negative lens and one positive lens. The second lens sub unit L12 covers the fifth to tenth surfaces and includes three positive lenses.

The second lens unit L2 covers the 11th to 15th surfaces and includes two negative lenses and one positive lens. The third lens unit L3 covers the 16th to 18th surfaces and includes one negative lens and one positive lens. The fourth lens unit L4 covers the 19th to 27th surfaces and includes one negative lens and three positive lenses. The fifth lens unit L5 covers the 29th to 37th surfaces and includes three negative lenses and two positive lenses. The sixth lens unit L6 covers the 38th to 40th surfaces and includes one negative lens and one positive lens.

The seventh lens unit L7 covers the 41st to 50th surfaces and includes two negative lenses and four positive lenses.

The correction lens unit includes one negative lens and one positive lens.

Aspheric surfaces are used for the 11th, 18th, 20th, and 26th surfaces.

The 11th surface mainly corrects variations in distortion and astigmatism due to zooming. The 18th surface mainly corrects variations in astigmatism due to zooming. The 26th surface mainly corrects variations in astigmatism and spherical aberration due to zooming.

Figure 6:
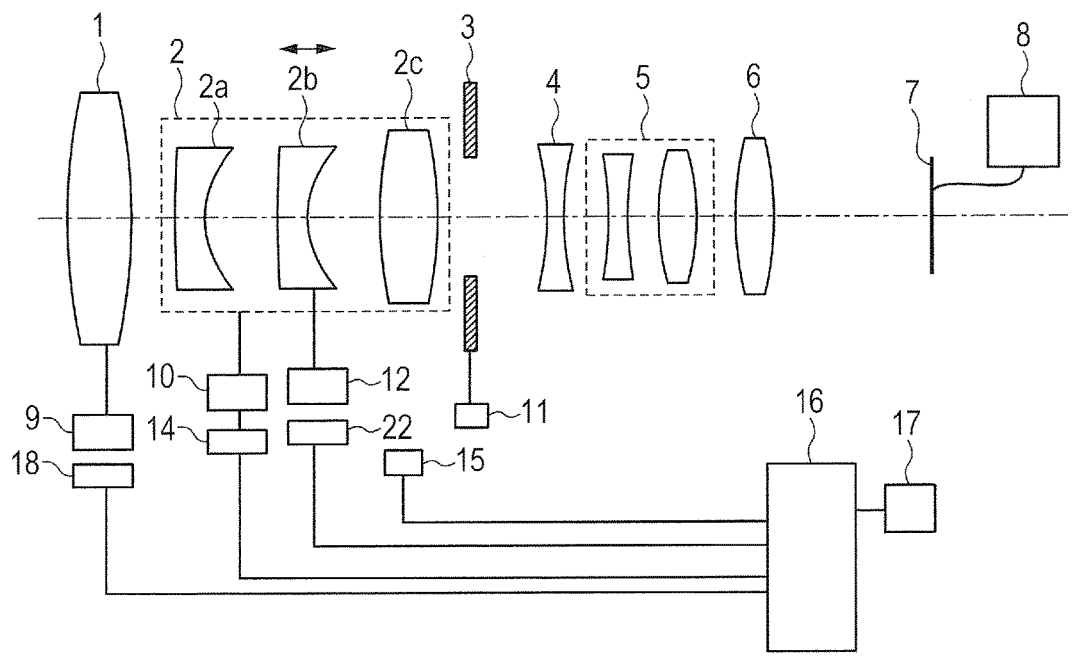
FIG. 6 is a schematic diagram of main parts of an image pickup apparatus according to embodiment 2.

FIG. 6 shows the configuration of an image pickup apparatus in embodiment 2 of the present invention.

The configuration of embodiment 2 is the same as embodiment 1 except that:
(A1) the magnification lens unit 2 includes three lens units (first variator 2a, second variator 2b, and compensator 2c);
(A2) a focus position detector 18 that detects the position of the focus lens unit 1 is included;
(A3) the second variator 2b is capable of moving in the optical axis direction for correcting the in-focus position independently of movement with a cam mechanism for magnification;
(A4) the correction lens unit has a negative power; and
(A5) an extender lens unit 5 is disposed between the relay lens units 4 and 6.

Note that in a more specific form of this embodiment, the first variator, the second variator, and the compensator may be driven by a cam mechanism, and the second variator, which is a correction lens unit, may be moved by a motor mechanism provided inside a cylindrical cam to correct displacement of the in-focus position due to change in temperature. For the motor mechanism, an ultrasonic motor, a voice coil motor, a stepping motor, or the like may be used.

Assume that the in-focus position has been displaced due to changes in zoom position, changes in position of the focus lens, and changes in temperature in embodiment 2. In embodiment 2, displacements of the in-focus position due to changes in zoom position, changes in position of the focus lens, and changes in temperature are recorded in the record part 17 at the time of assembly adjustment. Then, based on signals from the zoom position detector 14, the focus position detector 18, and the temperature sensor 15, the computation part 16 selects an amount of displacement of the in-focus position recorded in the record part 17, and inputs it to the drive part 12 for the correction lens unit. Based on the signal from the computation part 16, the drive part 12 for the correction lens unit moves the correction lens unit 2b on the optical axis to correct the amount of displacement of the in-focus position.

In embodiment 2, the maximum aperture Fno of the zoom lens is 1.85.

In embodiment 2, the diameter of permissible circle of confusion δ is 0.010 mm. Thus, the depth of focus D is 0.018 mm. In embodiment 2, the maximum amount of displacement of the focus position due to a change in zoom position is 0.2D (wide angle end) to 24.0D (telephoto end), i.e. 0.004 (wide angle end) to 0.444 (telephoto end) mm. The maximum amount of displacement of the focus position due to a change in temperature is 2D (wide angle end) to 240D (telephoto end), i.e. 0.036 (wide angle end) to 4.440 (telephoto end) mm. The maximum amount of displacement of the focus position due to a change in position of the focus lens is 0.01D (wide angle end) to 144.00D (telephoto end), i.e. 0.0002 (wide angle end) to 2.5920 (telephoto end) mm. From the above, the in-focus position changes by 0.040 (wide angle end) to 7.476 (telephoto end) mm. Then, the amount of change in in-focus position by movement of the correction lens unit may be set at 0.040 (wide angle end) to 7.476 (telephoto end) mm. The amount of change in in-focus position by 1 mm of movement of the correction lens unit is 0.0978 (wide angle end) to 4.0515 (telephoto end) mm. Then, the maximum absolute value Mb of the amount of movement of the correction lens unit for correcting a change in in-focus position is greatest at the telephoto end and is 1.845 mm. The amount of movement of the second lens unit L2, which has the greatest absolute value of the amount of movement in the magnification lens unit, is 189.932 mm.

Values for the above-mentioned conditional expressions in embodiment 2 are shown in table 1. Numerical example 2 satisfies all the conditional expressions and implements a zoom lens being capable of achieving good correction of displacement of the in-focus position due to changes in zoom position, changes in position of the focus lens, changes in temperature, and changes in stop value while achieving quick zoom operation and good optical performance.

Embodiment 3

A zoom lens in embodiment 3 will be specifically described with reference to FIG. 7.

Figure 7:
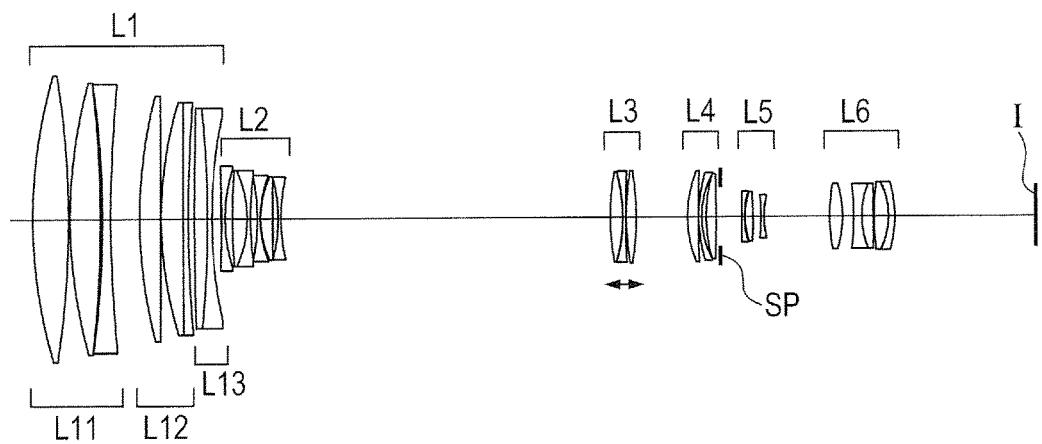
FIG. 7 is a cross-sectional view of a lens according to embodiment 3 at the wide angle end in focus at infinity.
Figure 8A:
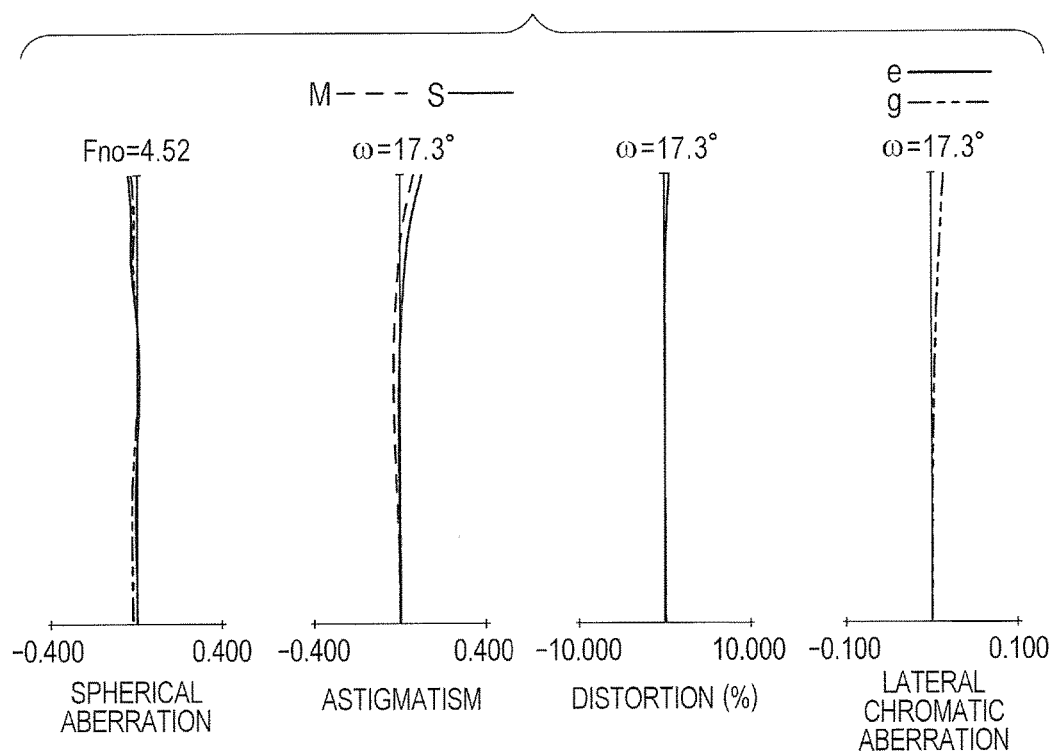
FIG. 8A is a set of diagrams of aberrations at the wide angle end with an infinite distance object in focus in embodiment 3.
Figure 8B:
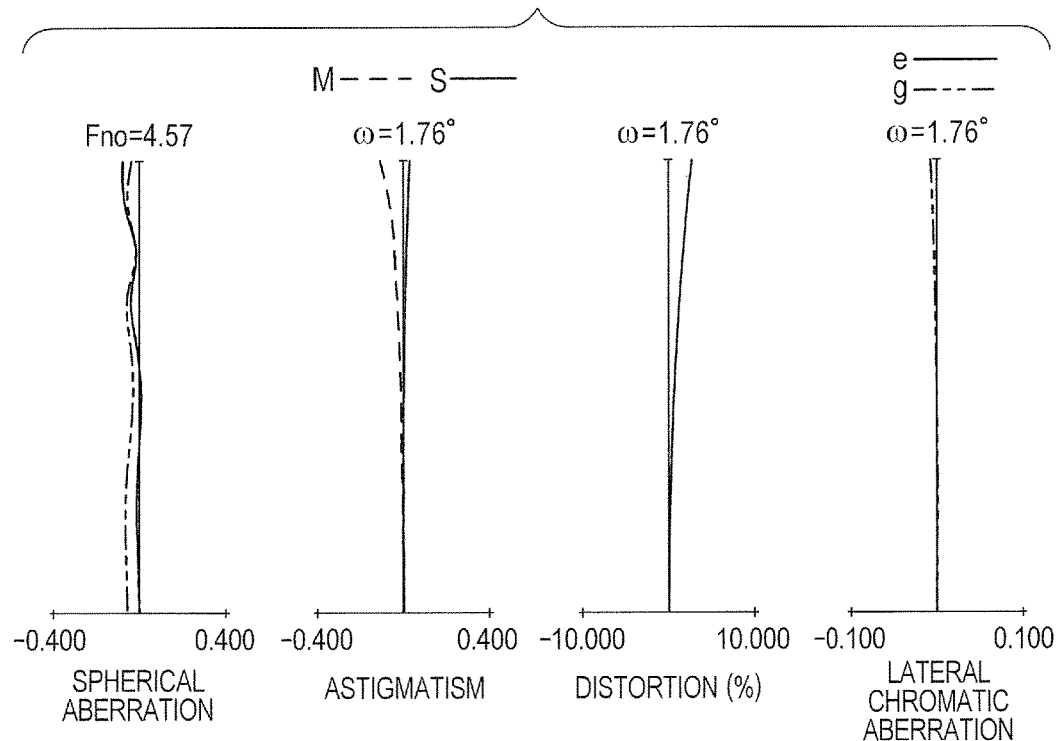
FIG. 8B is a set of diagrams of aberrations at a focal length of 505.0 mm with an infinite distance object in focus in embodiment 3.
Figure 8C:
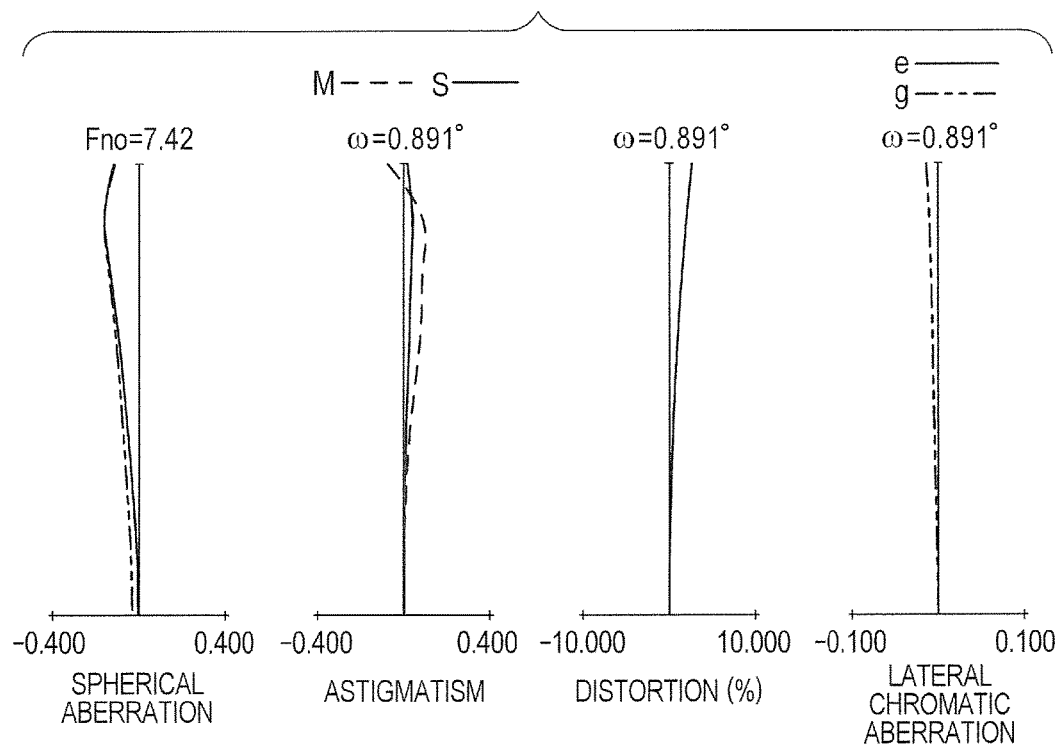
FIG. 8C is a set of diagrams of aberrations at the telephoto end with an infinite distance object in focus in embodiment 3.

In FIG. 7, a first lens unit L1 is a lens unit with a positive refractive power that does not move for magnification. A second lens unit L2 is a first variator with a negative refractive power that moves in magnification, and performs magnification from the wide angle end to the telephoto end by monotonically moving on the optical axis toward the image plane side. A third lens unit L3 is a second variator with a positive refractive power, and performs magnification from the wide angle end to the telephoto end by moving on the optical axis. A fourth lens unit L4 is a compensator with a positive refractive power, and corrects image plane displacement resulting from magnification by moving on the optical axis from the image side toward the object side. SP is a stop, and a fifth lens unit L5 is a front relay lens unit. A sixth lens unit L6 is a rear relay lens unit. I is an image pickup plane. Moreover, the first lens unit L1 includes a first lens sub unit L11 with a positive refractive power, a second lens sub unit L12 with a positive refractive power, and a third lens sub unit L13 with a negative refractive power, and performs focusing on a close distance object by feeding the second lens sub unit L12 from the image side toward the object side.

In embodiment 3, a correction lens unit is identical to the third lens unit L3, or the second variator, and moves on the optical axis to correct displacement of the in-focus position.

The first lens unit L1 covers the 1st to 14th surfaces. The first lens sub unit L11 covers the first to sixth surfaces and includes one negative lens and two positive lenses. The second lens sub unit L12 covers the 7th to 11th surfaces and includes one negative lens and two positive lenses. The third lens sub unit L13 covers the 12th to 14th surfaces and includes one negative lens and one positive lens.

The second lens unit L2 covers the 15th to 25th surfaces and includes four negative lenses and two positive lenses. The third lens unit L3 covers the 26th to 31st surfaces and includes one negative lens and two positive lenses. The fourth lens unit L4 covers the 32nd to 37th surfaces and includes one negative lens and two positive lenses. The fifth lens unit L5 covers the 39th to 44th surfaces and includes two negative lenses and one positive lens. The sixth lens unit L6 covers the 45th to 52nd surfaces and includes two negative lenses and three positive lenses.

The correction lens unit covers the 26th to 31st surfaces and includes three lenses, namely, one negative lens and two positive lenses. An aspheric surface is used for the 29th surface, and it mainly corrects variations in spherical aberration and astigmatism due to zooming.

Figure 9:
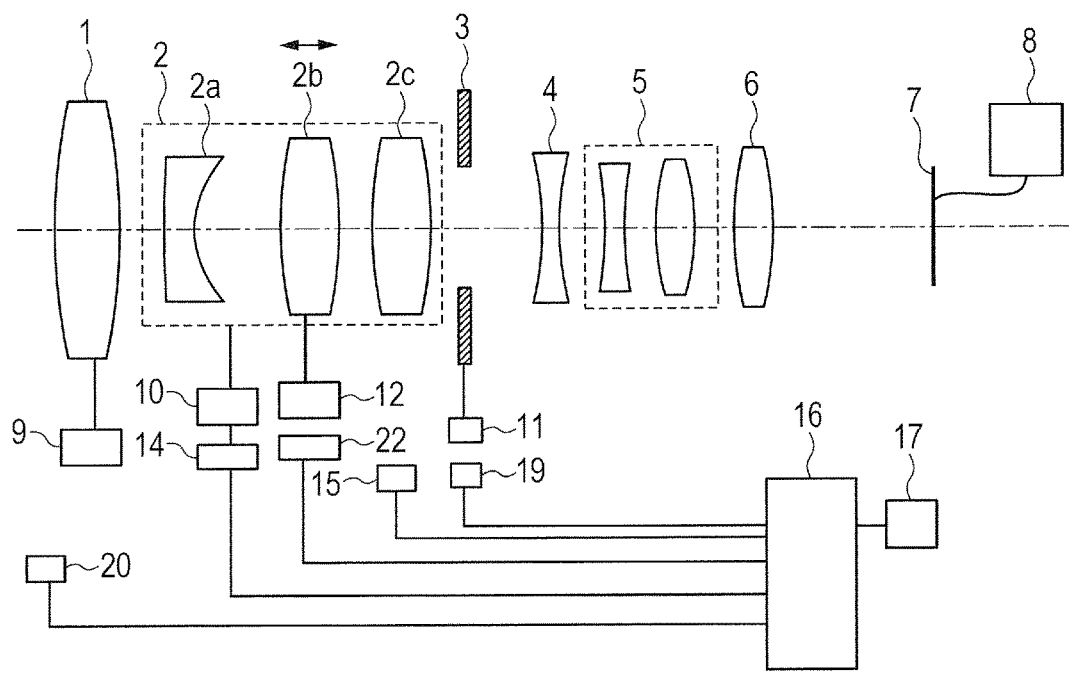
FIG. 9 is a schematic diagram of main parts of an image pickup apparatus according to embodiment 3.

FIG. 9 shows the configuration of an image pickup apparatus of embodiment 3 of the present invention.

The configuration of embodiment 3 is the same as embodiment 1 except that:

(B1) a stop value detector 19 that detects the stop value of the aperture stop 3 is included;

(B2) a posture detector 20 that detects the posture of the zoom lens is included;

(B3) amounts of displacement of the in-focus position due to changes in position of the focus lens and changes in stop value are recorded in the record part 17;

(B4) the magnification lens unit 2 includes three lens units (first variator 2a, second variator 2b, and compensator 2c); and (B5) the second variator 2b is capable of moving in the optical axis direction for correcting the in-focus position independently of movement with a cam mechanism for magnification.

Assume that the in-focus position has been displaced due to a manufacturing error of the magnification lens unit, changes in temperature, and changes in posture of the zoom lens in embodiment 3. In embodiment 3, displacements of the in-focus position due to changes in zoom position, changes in temperature, changes in stop value, and changes in posture are recorded in the record part 17 at the time of assembly adjustment. Then, based on signals from the zoom position detector 14, the temperature sensor 15, the stop value detector 19, and the posture detector 20, the computation part 16 selects an amount of displacement of the in-focus position recorded in the record part 17, and inputs it to the drive part 12 for the correction lens unit. Based on the signal from the computation part 16, the drive part 12 for the correction lens unit moves the correction lens unit 2b on the optical axis to correct the amount of displacement of the in-focus position.

In embodiment 3, the maximum aperture Fno of the zoom lens is 4.52.

As in embodiment 1, the diameter of permissible circle of confusion δ is 0.005 mm. Thus, the depth of focus D is 0.023 mm.

In embodiment 3, the maximum amount of displacement of the focus position due to a change in zoom position is 0.1D (wide angle end) to 2.0D (telephoto end), i.e. 0.002 (wide angle end) to 0.046 (telephoto end) mm. The maximum amount of displacement of the focus position due to a change in temperature is 1D (wide angle end) to 20D (telephoto end), i.e. 0.023 (wide angle end) to 0.460 (telephoto end) mm. The maximum amount of displacement of the focus position due to a change in posture is 0.5D (wide angle end) to 20D (telephoto end), i.e. 0.012 (wide angle end) to 0.460 (telephoto end) mm. The maximum amount of displacement of the focus position due to a change in stop value is 0.5D (wide angle end) to 1D (telephoto end), i.e. 0.012 (wide angle end) to 0.023 (telephoto end) mm. From the above, the in-focus position changes by 0.047 (wide angle end) to 0.989 (telephoto end) mm. Then, the amount of change in in-focus position by movement of the correction lens unit may be set at 0.047 (wide angle end) to 0.989 (telephoto end) mm.

The amount of change in in-focus position by 1 mm of movement of the correction lens unit is −0.057 (wide angle end) to −1.832 (telephoto end) mm. Then, the maximum absolute value Mb of the amount of movement of the correction lens unit for correcting a change in in-focus position is greatest at the wide angle end and is 0.826 mm. The amount of movement of the second lens unit L2, which has the greatest absolute value of the amount of movement in the magnification lens unit, is 126.660 mm.

Values for the above-mentioned conditional expressions in embodiment 3 are shown in table 1. Numerical example 3 satisfies all the conditional expressions and implements a zoom lens being capable of achieving good correction of displacement of the in-focus position due to changes in zoom position, changes in temperature, and changes in posture while achieving quick zoom operation and good optical performance.

Embodiment 4

A zoom lens in embodiment 4 will be specifically described with reference to FIG. 10.

Figure 10:
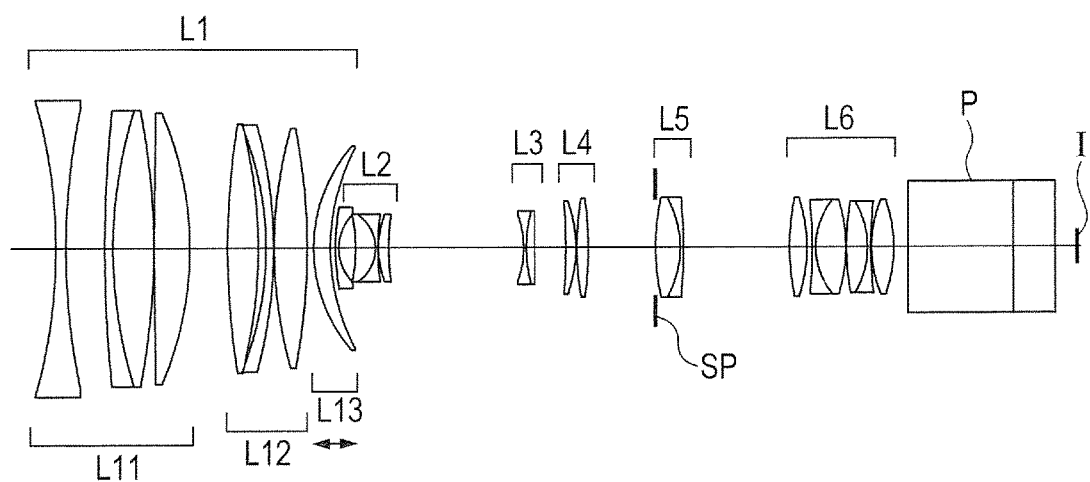
FIG. 10 is a cross-sectional view of a lens according to embodiment 4 at the wide angle end in focus at infinity.
Figure 11A:
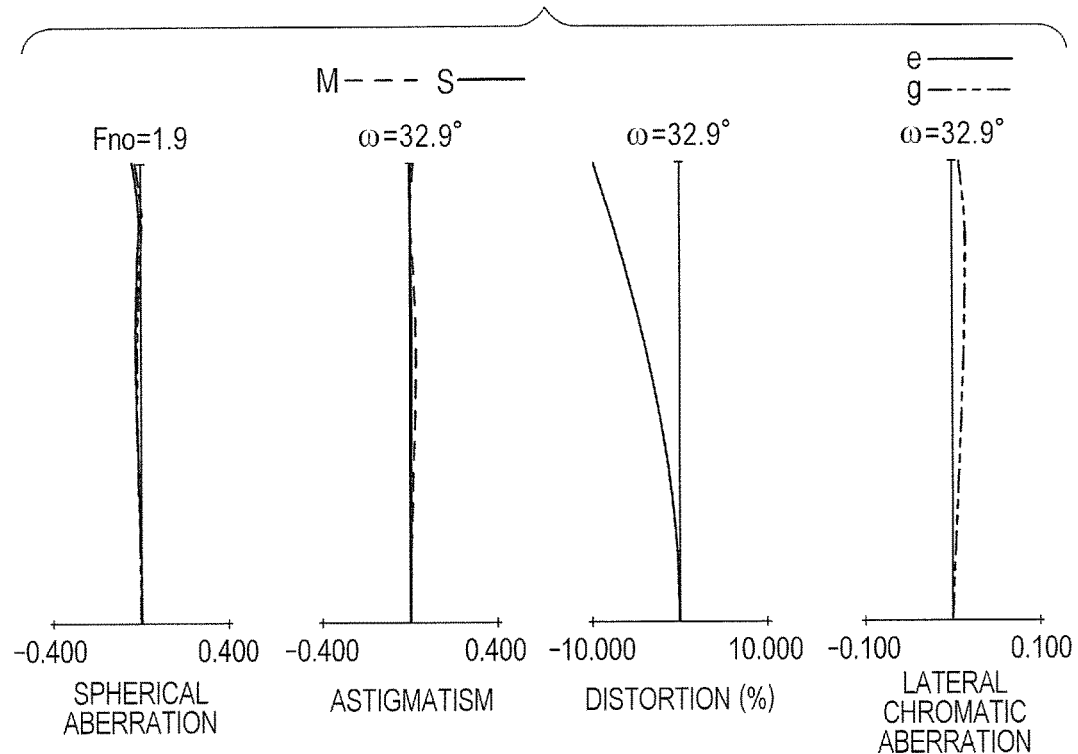
FIG. 11A is a set of diagrams of aberrations at the wide angle end with an infinite distance object in focus in embodiment 4.
Figure 11B:
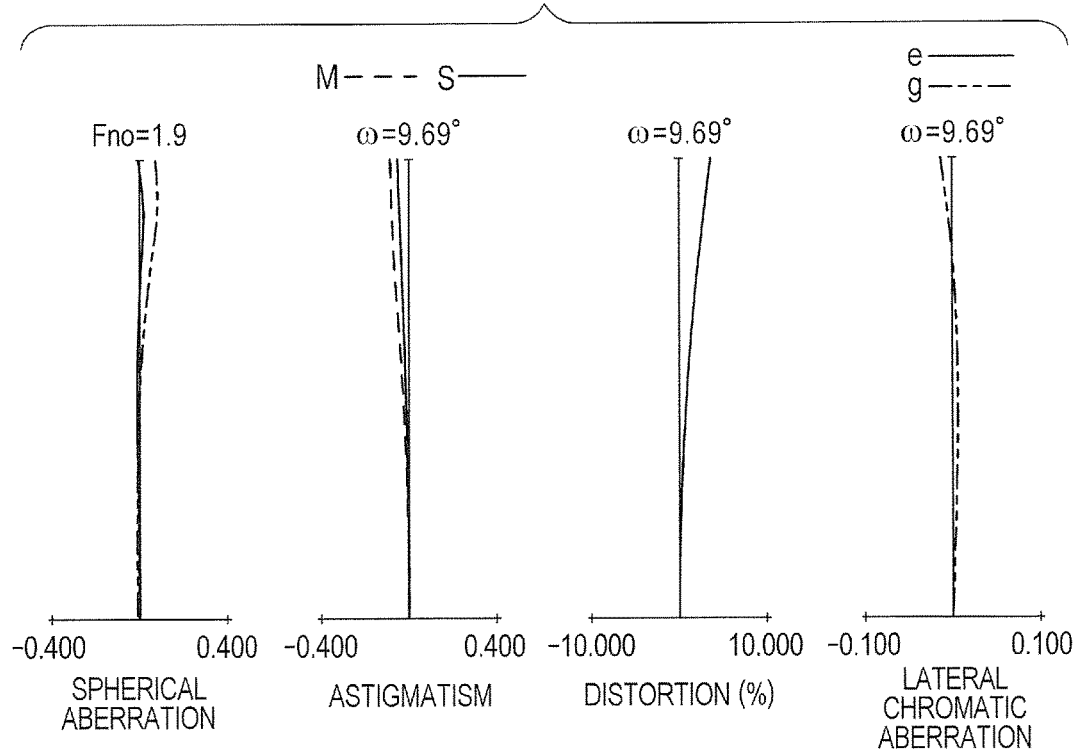
FIG. 11B is a set of diagrams of aberrations at a focal length of 32.2 mm with an infinite distance object in focus in embodiment 4.
Figure 11C:
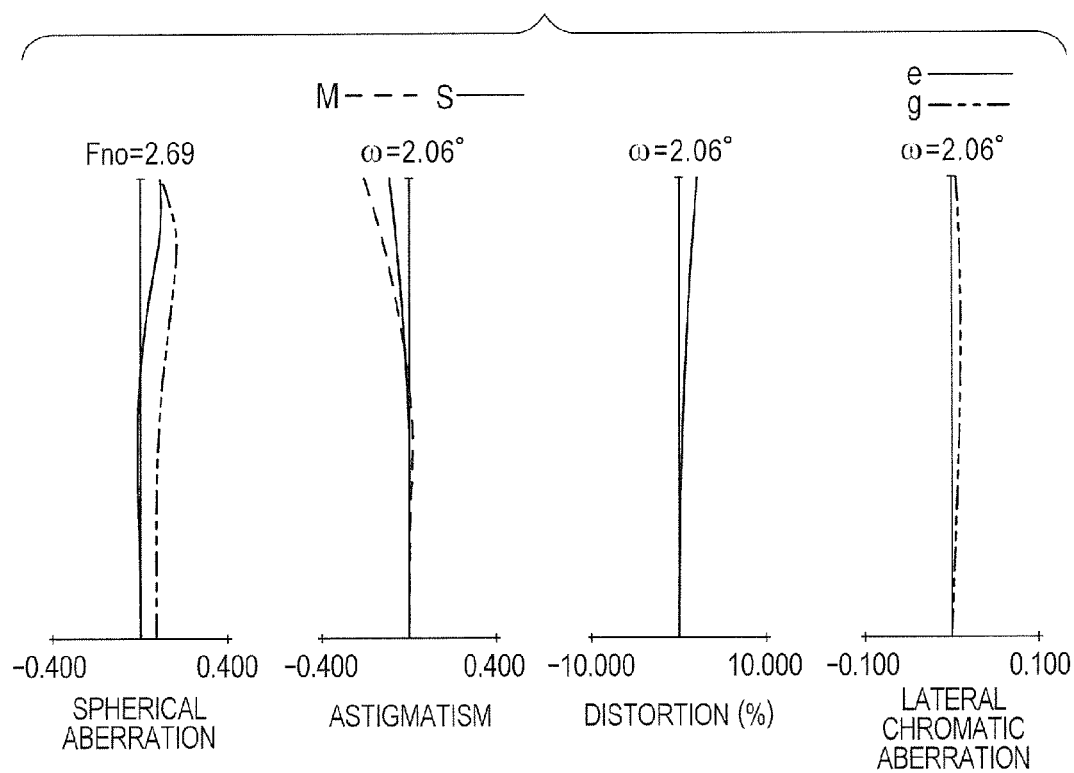
FIG. 11C is a set of diagrams of aberrations at the telephoto end with an infinite distance object in focus in embodiment 4.

In FIG. 10, a first lens unit L1 is a lens unit with a positive refractive power that does not move for magnification. A second lens unit L2 is a variator with a negative refractive power that moves in magnification, and performs magnification from the wide angle end to the telephoto end by monotonically moving on the optical axis toward the image plane side. A third lens unit L3 is a second variator with a negative refractive power, and performs magnification from the wide angle end to the telephoto end by moving on the optical axis. A fourth lens unit L4 is a compensator with a positive refractive power, and corrects image plane displacement resulting from magnification by moving on the optical axis from the image side toward the object side. SP is a stop, a fifth lens unit L5 is a front relay lens unit, and a sixth lens unit L6 is a rear relay lens unit. P is a color separation prism optical system, and I is an image pickup plane. Moreover, the first lens unit L1 includes a first lens sub unit L11 with a negative refractive power, a second lens sub unit L12 with a positive refractive power, and a third lens sub unit L13 with a positive refractive power, and performs focusing on a close distance object by feeding the second lens sub unit L12 from the image side toward the object side.

In embodiment 4, a correction lens unit is the third lens sub unit L13 and moves on the optical axis to correct displacement of the in-focus position.

The first lens unit L1 covers the 1st to 15th surfaces. The first lens sub unit L11 covers the first to seventh surfaces and includes two negative lenses and two positive lenses. The second lens sub unit L12 covers the 8th to 13th surfaces and includes one negative lens and two positive lenses. The third lens sub unit L13 covers the 14th to 15th surfaces and includes one positive lens.

The second lens unit L2 covers the 16th to 22nd surfaces and includes two negative lenses and two positive lenses. The third lens unit L3 covers the 23rd to 25th surfaces and includes one negative lens and one positive lens. The fourth lens unit L4 covers the 26th to 29th surfaces and includes two positive lenses. The fifth lens unit L5 covers the 31st to 33rd surfaces and includes one negative lens and one positive lens. The sixth lens unit L6 covers the 34th to 43rd surfaces and includes two negative lenses and four positive lenses.

The correction lens unit covers the 14th to 15th surfaces and includes one positive lens.

Figure 12:
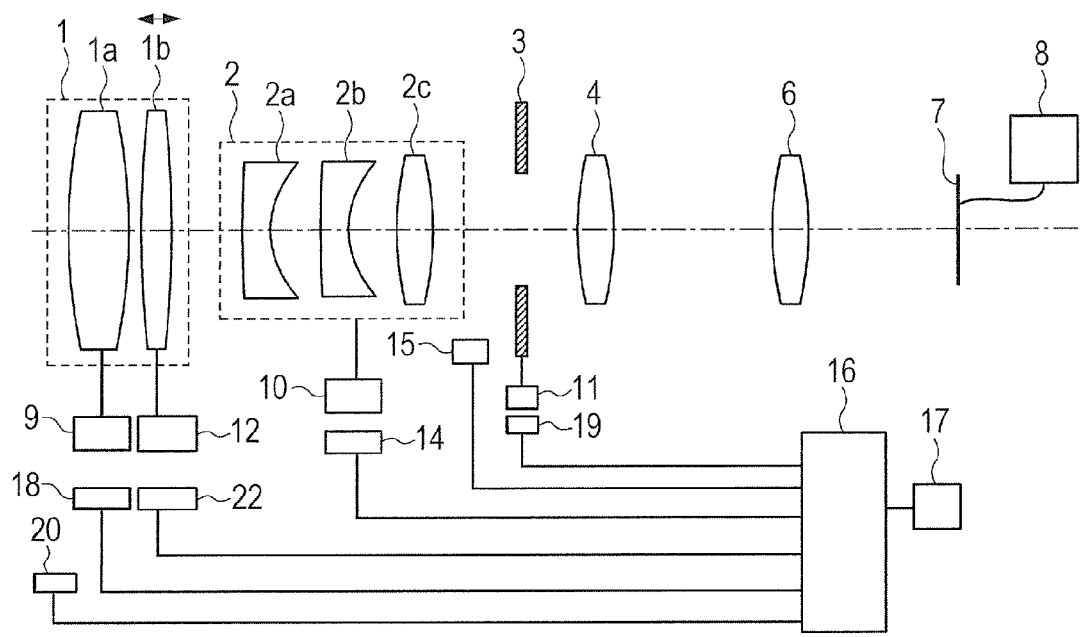
FIG. 12 is a schematic diagram of main parts of an image pickup apparatus according to embodiment 4.

FIG. 12 shows the configuration of an image pickup apparatus of embodiment 4 of the present invention.

The configuration of embodiment 4 is the same as embodiment 1 except that:
(C1) a stop value detector 19 that detects the stop value of the aperture stop 3 is included;
(C2) a posture detector 20 that detects the posture of the zoom lens is included;
(C3) a focus position detector 18 that detects the position of the focus lens unit 1 is included;
(C4) amounts of displacement of the in-focus position due to changes in position of the focus lens, changes in stop value, and changes in posture are recorded in the record part 17; and
(C5) the magnification lens unit includes three units.

Assume that the in-focus position has been displaced due to a manufacturing error of the magnification lens unit, changes in temperature, and changes in posture in embodiment 4. In embodiment 4, displacements of the in-focus position due to changes in zoom position, changes in temperature, changes in stop value, changes in position of the focus lens unit 1, and changes in posture are recorded in the record part 17 at the time of assembly adjustment. Then, based on signals from the zoom position detector 14, the temperature sensor 15, the focus position detector 18, the stop value detector 19, and the posture detector 20, the computation part 16 selects an amount of displacement of the in-focus position recorded in the record part 17, and inputs it to the drive part 12 for the correction lens unit. Based on the signal from the computation part 16, the drive part 12 for the correction lens unit moves the correction lens unit 1b on the optical axis to correct the amount of displacement of the in-focus position.

In embodiment 4, the maximum aperture Fno of the zoom lens is 1.9.

As in embodiment 1, the diameter of permissible circle of confusion δ is 0.005 mm. Thus, the depth of focus D is 0.010 mm.

In embodiment 4, the maximum amount of displacement of the focus position due to a change in zoom position is 0.1D (wide angle end) to 5.0D (telephoto end), i.e. 0.001 (wide angle end) to 0.050 (telephoto end) mm. The maximum amount of displacement of the focus position due to a change in temperature is 0.4D (wide angle end) to 40D (telephoto end), i.e. 0.004 (wide angle end) to 0.400 (telephoto end) mm. The maximum amount of displacement of the focus position due to a change in position of the focus lens unit 1 is 0.4D (wide angle end) to 20.0D (telephoto end), i.e. 0.004 (wide angle end) to 0.200 (telephoto end) mm. The maximum amount of displacement of the focus position due to a change in posture is 0.5D (wide angle end) to 20D (telephoto end), i.e. 0.005 (wide angle end) to 0.200 (telephoto end) mm. The maximum amount of displacement of the focus position due to a change in stop value is 0.5D (wide angle end) to 1D (telephoto end), i.e. 0.005 (wide angle end) to 0.010 (telephoto end) mm. From the above, the in-focus position changes by 0.019 (wide angle end) to 0.860 (telephoto end) mm. Then, the amount of change in in-focus position by movement of the correction lens unit may be set at 0.019 (wide angle end) to 0.860 (telephoto end) mm.

The amount of change in in-focus position by 1 mm of movement of the correction lens unit is 0.012 (wide angle end) to 3.870 (telephoto end) mm. Then, the maximum absolute value Mb of the amount of movement of the correction lens unit for correcting a change in in-focus position is greatest at the wide angle end and is 1.58 mm. The amount of movement of the second lens unit L2, which has the greatest absolute value of the amount of movement in the magnification lens unit, is 47.805 mm.

Values for the above-mentioned conditional expressions in embodiment 4 are shown in table 1. Numerical example 4 satisfies all the conditional expressions and implements a zoom lens being capable of achieving good correction of displacement of the in-focus position due to changes in zoom position, changes in temperature, and changes in posture while achieving quick zoom operation and good optical performance.

Next, numerical examples 1 to 4, corresponding to embodiments 1 to 4 of the present invention, will be shown. In each numerical example, i denotes the sequential position of a surface from the object side, ri denotes the radius of curvature of the i-th surface from the object side, di denotes the interval between the i-th surface and the i+1-th surface from the object side, and ndi and vdi denote the refractive index and Abbe number of the i-th optical member. The focal length, F-number, and angle of view each indicate values with an infinite distance object brought into focus. BF denotes the distance from the final surface of the lens to the image plane.

Note that the shape of each aspheric surface is expressed by the following equation, where x is the coordinate in the optical axis direction, y is the coordinate in a direction perpendicular to the optical axis, R is the radius of curvature of a datum, k is the conic constant, and An is the n-order aspherical coefficient. Here, "e-x" means "×10$^{-x}$". Meanwhile, in each table, an asterisk is placed by the right side of the surface number of each lens surface having an aspheric surface.

$$x=(y^2/r)/\{1+(1-ky^2/r^2)^{0.5}\}+A3xy^3+A4xy^4+A5xy^5+A6xy^6+A7xy^7+A8xy^8+A9xy^9+A10xy^{10}+A11xy^{11}+A12xy^{12}+A13xy^{13}+A14xy^{14}+A15xy^{15}+A16xy^{16}$$

[Numerical Example 1]
[unit: mm]

Surface Data

| surface no. i | ri | di | ndi | vdi |
|---|---|---|---|---|
| 1 | 138.290 | 3.00 | 1.77250 | 49.6 |
| 2 | 45.835 | 23.12 | | |
| 3 | −183.064 | 2.50 | 1.75500 | 52.3 |
| 4 | 113.462 | 2.25 | | |
| 5 | 101.811 | 6.95 | 1.92286 | 20.9 |
| 6 | 336.642 | 1.93 | | |
| 7* | 193.027 | 7.71 | 1.62041 | 60.3 |
| 8 | −320.346 | 10.12 | | |
| 9 | 113.683 | 10.53 | 1.59522 | 67.7 |
| 10 | −263.309 | 0.20 | | |
| 11 | 131.090 | 2.00 | 1.84666 | 23.8 |
| 12 | 48.907 | 17.07 | 1.43875 | 94.9 |
| 13 | −238.460 | 0.70 | | |
| 14 | 84.931 | 10.88 | 1.77250 | 49.6 |
| 15 | −201.858 | (variable) | | |
| 16* | 47.618 | 1.20 | 2.00100 | 29.1 |
| 17 | 17.463 | 7.48 | | |
| 18 | −36.790 | 0.80 | 1.81600 | 46.6 |
| 19 | 67.530 | 0.49 | | |
| 20 | 43.020 | 4.90 | 2.00069 | 25.5 |
| 21 | −40.983 | 1.36 | | |
| 22 | −25.444 | 0.90 | 1.83481 | 42.7 |
| 23 | −60.428 | (variable) | | |
| 24 | −27.865 | 0.80 | 1.64000 | 60.1 |
| 25 | 104.327 | 2.65 | 1.80809 | 22.8 |
| 26 | −266.605 | (variable) | | |
| 27(stop) | ∞ | 1.44 | | |
| 28 | 6523.184 | 3.33 | 1.77250 | 49.6 |
| 29 | −60.176 | 0.20 | | |
| 30 | 193.508 | 3.93 | 1.58913 | 61.1 |
| 31 | −62.382 | 0.20 | | |
| 32 | 71.671 | 5.65 | 1.51633 | 64.1 |
| 33 | −42.725 | 1.20 | 2.00069 | 25.5 |
| 34 | 1119.204 | 0.20 | | |
| 35 | 25.284 | 3.68 | 1.51633 | 64.1 |
| 36 | 37.804 | 18.22 | | |
| 37 | 64.710 | 0.90 | 1.95375 | 32.3 |
| 38 | 18.647 | 6.02 | 1.80809 | 22.8 |
| 39 | −78.387 | 1.67 | | |
| 40 | 84.530 | 4.77 | 1.43875 | 94.9 |
| 41 | −23.861 | 1.00 | 1.80518 | 25.4 |
| 42 | 37.648 | 10.18 | | |
| 43 | 43.559 | 7.95 | 1.59522 | 67.7 |
| 44 | −39.312 | 1.20 | 1.88300 | 40.8 |
| 45 | −69.517 | (variable) | | |
| image plane | ∞ | | | |

Aspheric Surface Data

7th surface

K = −1.71514e+001
A4 = −3.20929e−007
A6 = 3.48941e−011
A8 = −1.53210e−014
A10 = −4.52383e−017
A12 = 1.15875e−019
A14 = −8.93768e−023
A16 = 2.38146e−026

16th surface

K = −9.30561e+000
A4 = 1.50118e−005
A6 = −1.48694e−008
A8 = 1.85537e−011
A10 = −2.77813e−014
A12 = 1.93588e−015
A14 = −1.26481e−017
A16 = 2.71022e−020

[Numerical Example 1]
[unit: mm]

Various Data
Zoom Ratio 5.00

|  | Wide Angle | Middle | Telephoto |
|---|---|---|---|
| Focal Length | 19.00 | 45.60 | 95.00 |
| F-NUMBER | 2.70 | 2.70 | 2.70 |
| Angle Field | 39.30 | 18.83 | 9.30 |
| Image Height | 15.55 | 15.55 | 15.55 |
| Lens Total Length | 272.75 | 272.75 | 272.75 |
| BF | 41.36 | 41.36 | 41.36 |
| d15 | 0.85 | 23.17 | 34.58 |
| d23 | 29.06 | 6.80 | 4.52 |
| d26 | 10.20 | 10.14 | 1.02 |
| d45 | 41.36 | 41.36 | 41.36 |

Zoom lens unit Data

| Unit | Start Surface | Focal Length |
|---|---|---|
| 1 | 1 | 45.00 |
| 2 | 16 | −24.80 |
| 3 | 24 | −55.00 |
| 4 | 27 | 40.33 |

[Numerical Example 2]
[unit: mm]

Surface Data

| surface no. i | ri | di | ndi | vdi |
|---|---|---|---|---|
| 1 | 7000.000 | 6.00 | 1.83400 | 37.2 |
| 2 | 356.376 | 1.92 | | |
| 3 | 354.498 | 25.09 | 1.43387 | 95.1 |
| 4 | −604.712 | 26.01 | | |
| 5 | 365.238 | 19.93 | 1.43387 | 95.1 |
| 6 | −1528.069 | 0.25 | | |
| 7 | 236.158 | 19.60 | 1.43387 | 95.1 |
| 8 | 1240.318 | 1.20 | | |
| 9 | 208.601 | 12.42 | 1.49700 | 81.5 |
| 10 | 381.767 | (variable) | | |
| 11* | 4604.939 | 2.20 | 2.00330 | 28.3 |
| 12 | 56.758 | 10.61 | | |
| 13 | −90.754 | 1.40 | 1.78800 | 47.4 |
| 14 | 60.346 | 6.37 | 1.95906 | 17.5 |
| 15 | 2822.205 | (variable) | | |
| 16 | −77.611 | 1.40 | 1.83400 | 37.2 |
| 17 | 76.868 | 4.27 | 1.92286 | 18.9 |
| 18* | 3094.419 | (variable) | | |
| 19 | 288.163 | 12.15 | 1.60311 | 60.6 |
| 20* | −129.586 | 0.50 | | |
| 21 | 88.724 | 15.26 | 1.49700 | 81.5 |
| 22 | −483.672 | 0.20 | | |
| 23 | 111.193 | 2.50 | 1.84666 | 23.8 |
| 24 | 57.537 | 19.13 | 1.43875 | 94.9 |
| 25 | −443.098 | 0.16 | | |
| 26* | 446.000 | 3.99 | 1.49700 | 81.5 |
| 27 | −1480.372 | (variable) | | |
| 28(stop) | ∞ | 1.64 | | |
| 29 | −961.357 | 1.40 | 1.88300 | 40.8 |
| 30 | 54.169 | 4.35 | 1.80518 | 25.4 |
| 31 | −32540.640 | 4.59 | | |
| 32 | −68.810 | 1.85 | 1.81600 | 46.6 |
| 33 | 83.462 | 0.32 | | |
| 34 | 37.894 | 4.29 | 1.80809 | 22.8 |
| 35 | 143.041 | 3.78 | | |
| 36 | −150.325 | 1.58 | 1.88300 | 40.8 |
| 37 | 78.201 | (variable) | | |
| 38 | −90.545 | 1.91 | 1.71736 | 29.5 |
| 39 | 97.481 | 14.91 | 1.65160 | 58.5 |
| 40 | −74.406 | (variable) | | |
| 41 | −403.126 | 6.68 | 1.54814 | 45.8 |
| 42 | −56.456 | 3.12 | | |
| 43 | −257.236 | 3.07 | 1.88300 | 40.8 |
| 44 | 40.035 | 9.25 | 1.51742 | 52.4 |
| 45 | −64.123 | 0.20 | | |
| 46 | 1267.155 | 8.18 | 1.49700 | 81.5 |
| 47 | −30.062 | 2.50 | 1.83481 | 42.7 |
| 48 | −88.524 | 1.18 | | |
| 49 | 120.705 | 5.78 | 1.54814 | 45.8 |
| 50 | −51.632 | 14.45 | | |
| 51 | ∞ | 33.00 | 1.60859 | 46.4 |
| 52 | ∞ | 13.20 | 1.51633 | 64.2 |
| 53 | ∞ | (variable) | | |
| image plane | ∞ | | | |

Aspheric Surface Data

11th surface

K = 0.00000e+000
A4 = 4.75251e−007
A6 = 3.10090e−010
A8 = −9.85937e−013
A10 = 1.36448e−015
A12 = −6.91934e−019

18th surface

K = 0.00000e+000
A4 = 4.04444e−007
A6 = 4.62610e−010
A8 = −1.17218e−012
A10 = 1.72458e−015
A12 = −1.12858e−018

20th surface

K = −1.34149e+001
A4 = −5.55821e−007
A6 = 2.30199e−010
A8 = −7.33321e−014
A10 = 1.72749e−017
A12 = −2.05035e−021

26th surface

K = 1.15333e+002
A4 = −2.25415e−007
A6 = −1.06849e−010
A8 = −7.70580e−014
A10 = 8.17951e−017
A12 = −4.81179e−020

Various Data
Zoom Ratio 120.00

|  | Wide Angle | Middle | Telephoto |
|---|---|---|---|
| Focal Length | 9.00 | 300.00 | 1080.01 |
| F-NUMBER | 1.85 | 1.85 | 5.60 |
| Angle Field | 31.43 | 1.05 | 0.29 |
| Image Height | 5.50 | 5.50 | 5.50 |
| Lens Total Length | 651.95 | 651.95 | 651.95 |
| BF | 15.05 | 15.05 | 15.05 |
| d10 | 2.78 | 179.04 | 192.71 |
| d15 | 53.98 | 5.87 | 5.00 |
| d18 | 230.13 | 58.75 | 1.98 |
| d27 | 3.00 | 46.24 | 90.20 |
| d37 | 10.00 | 10.00 | 10.00 |
| d40 | 3.20 | 3.20 | 3.20 |
| d53 | 15.05 | 15.05 | 15.05 |

Zoom lens unit Data

| Unit | Start Surface | Focal Length |
|---|---|---|
| 1 | 1 | 257.79 |
| 2 | 11 | −40.33 |
| 3 | 16 | −101.22 |

-continued

[Numerical Example 2]
[unit: mm]

| | | |
|---|---|---|
| 4 | 19 | 65.57 |
| 5 | 28 | −37.29 |
| 6 | 38 | 1160.80 |
| 7 | 41 | 57.41 |

[Numerical Example 3]
[unit: mm]

Surface Data

| surface no. i | ri | di | ndi | vdi |
|---|---|---|---|---|
| 1 | 249.123 | 17.82 | 1.43387 | 95.1 |
| 2 | −454.251 | 0.70 | | |
| 3 | 250.827 | 15.18 | 1.43387 | 95.1 |
| 4 | −584.838 | 1.00 | | |
| 5 | −471.387 | 4.00 | 1.72047 | 34.7 |
| 6 | 656.783 | 14.39 | | |
| 7 | 241.946 | 10.44 | 1.43387 | 95.1 |
| 8 | −12435.993 | 0.20 | | |
| 9 | 198.376 | 10.96 | 1.43875 | 94.9 |
| 10 | 17517.083 | 2.50 | 1.72047 | 34.7 |
| 11 | 705.365 | 2.95 | | |
| 12 | 1746.277 | 6.60 | 1.76182 | 26.5 |
| 13 | −556.986 | 2.20 | 1.61800 | 63.3 |
| 14 | 238.913 | (variable) | | |
| 15 | −1112.512 | 1.80 | 1.81600 | 46.6 |
| 16 | 81.891 | 3.67 | | |
| 17 | 359.063 | 7.35 | 1.72047 | 34.7 |
| 18 | −57.106 | 1.50 | 1.59522 | 67.7 |
| 19 | 155.243 | 3.42 | | |
| 20 | −110.746 | 1.50 | 1.59522 | 67.7 |
| 21 | 58.334 | 0.10 | | |
| 22 | 49.169 | 6.05 | 1.72047 | 34.7 |
| 23 | 2572.247 | 2.77 | | |
| 24 | −76.882 | 1.40 | 1.59522 | 67.7 |
| 25 | 94.436 | (variable) | | |
| 26 | 122.675 | 6.16 | 1.61800 | 63.3 |
| 27 | −83.957 | 0.11 | | |
| 28 | −88.368 | 1.50 | 1.83400 | 37.2 |
| 29* | 803.207 | 0.20 | | |
| 30 | 136.277 | 4.96 | 1.49700 | 81.5 |
| 31 | −141.054 | (variable) | | |
| 32 | 61.538 | 5.33 | 1.48749 | 70.2 |
| 33 | 467.848 | 0.20 | | |
| 34 | 75.701 | 1.50 | 1.72047 | 34.7 |
| 35 | 45.508 | 2.22 | | |
| 36 | 76.311 | 5.06 | 1.49700 | 81.5 |
| 37 | −471.899 | (variable) | | |
| 38(stop) | ∞ | 10.52 | | |
| 39 | 603.249 | 1.40 | 1.88300 | 40.8 |
| 40 | 40.511 | 0.15 | | |
| 41 | 35.623 | 4.10 | 1.80518 | 25.4 |
| 42 | −171.923 | 3.93 | | |
| 43 | −109.907 | 1.50 | 1.91082 | 35.3 |
| 44 | 42.716 | (variable) | | |
| 45 | 90.190 | 6.40 | 1.49700 | 81.5 |
| 46 | −53.378 | 5.55 | | |
| 47 | −138.468 | 4.00 | 1.88300 | 40.8 |
| 48 | 42.246 | 5.87 | 1.60342 | 38.0 |
| 49 | −797.006 | 0.15 | | |
| 50 | 114.940 | 7.38 | 1.51742 | 52.4 |
| 51 | −35.981 | 3.00 | 1.88300 | 40.8 |
| 52 | −61.833 | (variable) | | |
| image plane | ∞ | | | |

Aspheric Surface Data

29th surface

K = 9.97936e+002
A4 = 1.35998e−007

[Numerical Example 3]
[unit: mm]

A6 = 1.65446e−012
A8 = −1.39892e−012
A10 = 3.35061e−015
A12 = −4.12714e−018

Various Data
Zoom Ratio    20.00

| | Wide Angle | Middle | Telephoto |
|---|---|---|---|
| Focal Length | 50.00 | 505.00 | 999.99 |
| F-NUMBER | 4.52 | 4.57 | 7.42 |
| Angle Field | 17.28 | 1.76 | 0.89 |
| Image Height | 15.55 | 15.55 | 15.55 |
| Lens Total Length | 498.54 | 498.54 | 498.54 |
| BF | 69.97 | 69.97 | 69.97 |
| d14 | 5.00 | 118.87 | 131.66 |
| d25 | 163.40 | 44.78 | 3.00 |
| d31 | 25.51 | 5.33 | 39.19 |
| d37 | 1.99 | 26.93 | 22.06 |
| d44 | 33.00 | 33.00 | 33.00 |
| d52 | 69.97 | 69.97 | 69.97 |

Zoom lens unit Data

| Unit | Start Surface | Focal Length |
|---|---|---|
| 1 | 1 | 255.00 |
| 2 | 15 | −34.76 |
| 3 | 26 | 111.89 |
| 4 | 32 | 121.92 |
| 5 | 38 | −45.99 |
| 6 | 45 | 90.29 |

[Numerical Example 4]
[unit: mm]

Surface Data

| surface no. i | ri | di | ndi | vdi |
|---|---|---|---|---|
| 1 | −168.583 | 3.12 | 1.83400 | 37.2 |
| 2 | 213.332 | 12.15 | | |
| 3 | 410.271 | 2.60 | 1.74950 | 35.3 |
| 4 | 145.125 | 12.81 | 1.43875 | 94.9 |
| 5 | −226.072 | 0.15 | | |
| 6 | 2011.936 | 11.15 | 1.43387 | 95.1 |
| 7 | −107.601 | 11.82 | | |
| 8 | 249.853 | 9.83 | 1.43387 | 95.1 |
| 9 | −149.851 | 2.41 | | |
| 10 | −100.905 | 2.37 | 1.74950 | 35.3 |
| 11 | −146.816 | 0.15 | | |
| 12 | 138.167 | 10.38 | 1.59522 | 67.7 |
| 13 | −198.196 | 2.00 | | |
| 14 | 48.850 | 5.25 | 1.74100 | 52.6 |
| 15 | 67.517 | (variable) | | |
| 16 | 78.618 | 1.00 | 1.88300 | 40.8 |
| 17 | 15.191 | 5.28 | | |
| 18 | −48.678 | 6.22 | 1.80809 | 22.8 |
| 19 | −12.679 | 0.75 | 1.88300 | 40.8 |
| 20 | 81.208 | 0.18 | | |
| 21 | 29.871 | 3.18 | 1.66680 | 33.0 |
| 22 | 79.591 | (variable) | | |
| 23 | −29.087 | 0.75 | 1.75700 | 47.8 |
| 24 | 40.552 | 2.71 | 1.84649 | 23.9 |
| 25 | 7232.290 | (variable) | | |
| 26 | −199.696 | 3.21 | 1.64000 | 60.1 |
| 27 | −41.168 | 0.15 | | |
| 28 | 83.319 | 3.61 | 1.51633 | 64.1 |
| 29 | −112.016 | (variable) | | |
| 30(stop) | ∞ | 0.15 | | |
| 31 | 68.727 | 7.77 | 1.51742 | 52.4 |
| 32 | −31.638 | 1.00 | 1.83400 | 37.2 |

-continued

[Numerical Example 4]
[unit: mm]

| 33 | −164.778 | 33.20 | | |
| 34 | 74.176 | 5.53 | 1.51633 | 64.1 |
| 35 | −48.389 | 1.68 | | |
| 36 | −143.574 | 1.00 | 1.77250 | 49.6 |
| 37 | 22.160 | 9.76 | 1.50127 | 56.5 |
| 38 | −48.141 | 0.14 | | |
| 39 | 79.676 | 6.67 | 1.48749 | 70.2 |
| 40 | −27.732 | 1.00 | 1.88300 | 40.8 |
| 41 | 131.646 | 0.13 | | |
| 42 | 37.163 | 7.05 | 1.48749 | 70.2 |
| 43 | −44.941 | 4.50 | | |
| 44 | ∞ | 33.00 | 1.60859 | 46.4 |
| 45 | ∞ | 13.20 | 1.51633 | 64.1 |
| 46 | ∞ | (variable) | | |
| image plane | ∞ | | | |

Various Data
Zoom Ratio 18.00

| | Wide Angle | Middle | Telephoto |
|---|---|---|---|
| Focal Length | 8.50 | 32.20 | 153.00 |
| F-NUMBER | 1.90 | 1.90 | 2.69 |
| Angle Field | 32.91 | 9.69 | 2.06 |
| Image Height | 5.50 | 5.50 | 5.50 |
| Lens Total Length | 320.71 | 320.71 | 320.71 |
| BF | 6.92 | 6.92 | 6.92 |
| d15 | 1.61 | 33.31 | 49.42 |
| d22 | 42.34 | 6.39 | 7.22 |
| d25 | 9.89 | 15.49 | 3.15 |
| d29 | 20.90 | 19.56 | 14.96 |
| d33 | 33.20 | 33.20 | 33.20 |
| d46 | 6.92 | 6.92 | 6.92 |

Zoom lens unit Data

| Unit | Start Surface | Focal Length |
|---|---|---|
| 1 | 1 | 59.96 |
| 2 | 16 | −13.89 |
| 3 | 23 | −41.78 |
| 4 | 26 | 43.15 |
| 5 | 30 | 362.85 |
| 6 | 34 | 54.85 |

The correspondence between each embodiment and each conditional expression mentioned above is shown in Table 1.

TABLE 1

Value for Each Conditional Expression in Numerical Examples 1 to 3

| | Embodiment 1 | Embodiment 2 | Embodiment 3 | Embodiment 4 |
|---|---|---|---|---|
| Mb | 0.653 | 1.845 | 0.614 | 1.580 |
| Mm | 33.730 | 189.932 | 126.660 | 47.805 |
| ΔSkw | 0.176 | 0.098 | −0.057 | 0.012 |
| ΔSkt | 4.400 | 4.052 | −1.832 | 3.870 |
| Fno | 2.70 | 1.85 | 4.52 | 1.90 |
| δ | 0.005 | 0.010 | 0.005 | 0.005 |
| D | 0.014 | 0.019 | 0.023 | 0.010 |
| Conditional Expression (1) | 0.019 | 0.010 | 0.005 | 0.033 |
| Conditional Expression (2) | 0.176 | 0.098 | 0.057 | 0.012 |
| Conditional Expression (3) | 0.040 | 0.024 | 0.031 | 0.003 |
| Conditional Expression (4) | 48.370 | 99.730 | 27.168 | 166.316 |

TABLE 1-continued

Value for Each Conditional Expression in Numerical Examples 1 to 3

| | Embodiment 1 | Embodiment 2 | Embodiment 3 | Embodiment 4 |
|---|---|---|---|---|
| Number of Lenses in Correction Unit | 1 | 2 | 3 | 1 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-054026, filed Mar. 17, 2016, which is hereby incorporated by reference herein in its entirety.

What is claimed is:

1. A zoom lens comprising in order from an object side to an image side: a focus lens unit that moves for focus adjustment, a magnification lens group including two or more lens units that move for magnification, and a relay lens unit that does not move for magnification, wherein a correction lens unit is disposed in the focus lens unit or the magnification lens group and moves in an optical axis direction to correct displacement of an in-focus position of the zoom lens, and conditional expressions $$0.001 < Mb/Mm < 0.100,$$

$$0.005 < |\Delta Skw| < 0.500, \text{ and}$$

$$0.001 < \Delta Skw/\Delta Skt < 0.100$$

are satisfied, where $\Delta Skw$ is an amount (mm) of change in the in-focus position at a wide angle end with the correction lens unit moved by 1 mm in the optical axis direction, $\Delta Skt$ is an amount (mm) of change in the in-focus position at a telephoto end with the correction lens unit moved by 1 mm in the optical axis direction, Mb is a maximum absolute value of an amount of movement of the correction lens unit for correcting displacement of the in-focus position, and Mm is a maximum absolute value of amounts of movement of the lens units in the magnification lens group.

2. The zoom lens according to claim 1, wherein the correction lens unit corrects one or more of displacement of the in-focus position due to a change in position of the lens units in the magnification lens group, displacement of the in-focus position due to a change in position of the focus lens unit, displacement of the in-focus position due to a change in temperature, displacement of the in-focus position due to a change in posture of the zoom lens, and displacement of the in-focus position due to a manufacturing error.

3. The zoom lens according to claim 1, further comprising a stop between the magnification lens group and the relay lens unit,
  wherein the correction lens unit corrects one or more of displacement of the in-focus position due to a change in position of the lens unit in the magnification lens group, displacement of the in-focus position due to a change in position of the focus lens unit, displacement of the in-focus position due to a change in temperature, displacement of the in-focus position due to a change in posture of the zoom lens, displacement of the in-focus position due to a manufacturing error, and displacement of the in-focus position due to a change in stop value of the stop.

4. The zoom lens according to claim 1, wherein the correction lens unit is disposed in the focus lens unit.

5. The zoom lens according to claim 1, wherein the correction lens unit is disposed in the magnification lens group.

6. The zoom lens according to claim 1, wherein the correction lens unit consists of one lens, two lenses, or three lenses.

7. An image pickup apparatus comprising: a zoom lens comprising in order from an object side to an image side: a focus lens unit that moves for focus adjustment, a magnification lens group including two or more lens units that move for magnification, and a relay lens unit that does not move for magnification, wherein a correction lens unit is disposed in the focus lens unit or the magnification lens group and moves in an optical axis direction to correct displacement of an in-focus position of the zoom lens, and conditional expressions $$0.001 < Mb/Mm < 0.100,$$

$$0.005 < |\Delta Skw| < 0.500, \text{ and}$$

$$0.001 < \Delta Skw/\Delta Skt < 0.100$$

are satisfied, where $\Delta Skw$ is an amount (mm) of change in the in-focus position at a wide angle end with the correction lens unit moved by 1 mm in the optical axis direction, $\Delta Skt$ is an amount (mm) of change in the in-focus position at a telephoto end with the correction lens unit moved by 1 mm in the optical axis direction, Mb is a maximum absolute value of an amount of movement of the correction lens unit for correcting displacement of the in-focus position, and Mm is a maximum absolute value of amounts of movement of the lens units in the magnification lens group; and an image pickup element that receives an optical image formed by the zoom lens, wherein conditional expressions $$D = Fno \times \delta, \text{ and}$$

$$1.0 < Mb/D < 300.0$$

are satisfied, where Fno is a maximum aperture of the zoom lens, $\delta$ is a diameter (mm) of permissible circle of confusion of the image pickup apparatus, and D is a depth of focus.

8. The image pickup apparatus according to claim 7, further comprising:
- a zoom position detector that detects position of the lens units in the magnification lens group;
- a focus position detector that detects position of the focus lens unit;
- a stop value detector that detects stop value of a stop comprised in the zoom lens;
- a temperature sensor that detects temperature;
- a posture detector that detects posture of the zoom lens;
- a correction position detector that detects position of the correction lens unit;
- a driver that drives the correction lens unit; and
- a controller that obtains an amount of one or more of displacement of the in-focus position by a change in position of the lens units in the magnification lens group, displacement of the in-focus position by a change in position of the focus lens unit, displacement of the in-focus position by a change in temperature, displacement of the in-focus position by a change in the stop value, and displacement of the in-focus position by a change in the posture, and controls moving of the correction lens unit based on the obtained amount.

* * * * *